United States Patent
Moyer

(10) Patent No.: US 7,315,932 B2
(45) Date of Patent: *Jan. 1, 2008

(54) DATA PROCESSING SYSTEM HAVING INSTRUCTION SPECIFIERS FOR SIMD REGISTER OPERANDS AND METHOD THEREOF

(76) Inventor: William C. Moyer, 1005 Pier Branch Rd., Dripping Springs, TX (US) 78620

( * ) Notice: Subject to any disclaimer, the term of this patent is extended or adjusted under 35 U.S.C. 154(b) by 371 days.

This patent is subject to a terminal disclaimer.

(21) Appl. No.: 10/657,331

(22) Filed: Sep. 8, 2003

(65) Prior Publication Data

US 2005/0053012 A1 Mar. 10, 2005

(51) Int. Cl.
*G06F 15/80* (2006.01)
*G06F 15/82* (2006.01)

(52) U.S. Cl. ............................ 712/4; 712/22; 712/27; 712/225

(58) Field of Classification Search ................ 712/4, 712/22, 225, 27
See application file for complete search history.

(56) References Cited

U.S. PATENT DOCUMENTS

| | | | |
|---|---|---|---|
| 4,128,880 A | 12/1978 | Cray, Jr. | |
| 4,677,547 A | 6/1987 | Omoda et al. | |
| 4,744,043 A | 5/1988 | Kloker | |
| 4,760,545 A * | 7/1988 | Inagami et al. | 712/4 |
| 4,825,361 A | 4/1989 | Omoda et al. | |
| 4,898,691 A | 2/1990 | Borzo et al. | |
| 4,903,195 A * | 2/1990 | Honma | 710/52 |
| 4,918,600 A | 4/1990 | Harper et al. | |
| 5,201,056 A | 4/1993 | Daviel et al. | |
| 5,206,822 A | 4/1993 | Taylor | |
| 5,361,354 A | 11/1994 | Greyzek | |
| 5,390,352 A | 2/1995 | Kinoshita | |
| 5,450,607 A | 9/1995 | Kowalczyk et al. | |
| 5,475,852 A | 12/1995 | Yoshida et al. | |
| 5,530,804 A | 6/1996 | Edgington et al. | |
| 5,664,145 A * | 9/1997 | Apperley et al. | 711/117 |
| 5,669,013 A | 9/1997 | Watanabe et al. | |

(Continued)

OTHER PUBLICATIONS

Wulf, WM. A., "Evaluation of the WM Architecture", ACM ; Jul. 1992; pp. 382-390.

(Continued)

*Primary Examiner*—Daniel H. Pan
(74) *Attorney, Agent, or Firm*—Joanna G. Chiu; Robert L. King; Ranjeev Singh

(57) ABSTRACT

Various load and store instructions may be used to transfer multiple vector elements between registers in a register file and memory. A cnt parameter may be used to indicate a total number of elements to be transferred to or from memory, and an rcnt parameter may be used to indicate a maximum number of vector elements that may be transferred to or from a single register within a register file. Also, the instructions may use a variety of different addressing modes. The memory element size may be specified independently from the register element size such that source and destination sizes may differ within an instruction. With some instructions, a vector stream may be initiated and conditionally enqueued or dequeued. Truncation or rounding fields may be provided such that source data elements may be truncated or rounded when transferred. Also, source data elements may be sign- or unsigned-extended when transferred.

23 Claims, 12 Drawing Sheets

U.S. PATENT DOCUMENTS

| | | | |
|---|---|---|---|
| 5,697,788 | A | 12/1997 | Ohta |
| 5,717,947 | A | 2/1998 | Gallup et al. |
| 5,719,998 | A | 2/1998 | Ku et al. |
| 5,764,787 | A | 6/1998 | Nickerson |
| 5,799,163 | A | 8/1998 | Park et al. |
| 5,838,984 | A | 11/1998 | Nguyen et al. |
| 5,870,596 | A * | 2/1999 | Yoshida .................... 712/225 |
| 5,887,183 | A | 3/1999 | Agarwal et al. |
| 5,903,769 | A | 5/1999 | Arya |
| 6,052,766 | A | 4/2000 | Betker et al. |
| 6,081,880 | A | 6/2000 | Sollars |
| 6,170,001 | B1 * | 1/2001 | Hinds et al. ................ 708/495 |
| 6,192,384 | B1 | 2/2001 | Dally et al. |
| 6,202,130 | B1 | 3/2001 | Scales et al. |
| 6,292,886 | B1 | 9/2001 | Makineni et al. |
| 6,381,687 | B2 | 4/2002 | Sandstrom et al. |
| 6,513,107 | B1 | 1/2003 | Ansari |
| 6,598,221 | B1 | 7/2003 | Pegatoquet et al. |
| 6,647,546 | B1 | 11/2003 | Hinker et al. |
| 6,665,749 | B1 | 12/2003 | Ansari |
| 6,898,691 | B2 | 5/2005 | Blomgren et al. |
| 6,950,922 | B2 | 9/2005 | Chung et al. |
| 6,986,023 | B2 | 1/2006 | Paver et al. |
| 2003/0167460 | A1 | 9/2003 | Desai et al. |
| 2004/0117595 | A1 | 6/2004 | Norris et al. |
| 2005/0053012 | A1 | 3/2005 | Moyer |
| 2005/0055535 | A1 * | 3/2005 | Moyer et al. .................. 712/4 |
| 2005/0055543 | A1 * | 3/2005 | Moyer ........................ 712/225 |

OTHER PUBLICATIONS

Related U.S. Appl. No. 09/591,938, filed Jun. 12, 2000.
Related application filed concurrently herewith.
Related application filed concurrently herwith.
Talla, Deependra; "Architectural Techniques to Accelerate Multimedia Applications on General-Purpose Processors"; University of Texas Doctoral Dissertation: Aug. 2001; pp. 94-125 (Chapters 6 and 7); University of Texas, Austin, Texas.
Talla, Deepu et al.; "Bottlenecks in Multimedia Processing with SIMD Style Extensions and Architectural Enhancements"; IEEE Transactions of Computers: Aug. 2003; pp. 1015-1031; vol. 62, No. 8; IEEE.
Kavi, Krishna M. et al. ; "A Formal Definition of Data Flow Graph Models"; IEEE; 1988.

* cited by examiner lvex.[s/u].[ms].[ds] rD, rA, rB lvex.[s/u].[ms].[ds] rD, rA, cnt, stride lmvex.[s/u].[ms].[ds] rD, rA, rB lmvex.[s/u].[ms].[ds] rD, rA, cnt, stride, skip, skip_cnt lmvex2.[s/u].[ms].[ds] rD, rA, rB

| OPCODE | rD | rA | rB | SUBOPCODE | rB:
| cnt | rcnt | stride | skip |

*FIG. 6* lstrmvex.[s/u].[ms].[ds] rD, rA, rB

| OPCODE | rD | rA | rB | SUBOPCODE | rB:
| cnt | rcnt | stride | skip | skip_cnt |

*FIG. 7* stvex.[s/u].[ms].[ss].[h/l] rS, rA, rB

| OPCODE | rS | rA | rB | SUBOPCODE | rB:
| cnt | stride |

*FIG. 8* stmvex.[s/u].[ms].[ss].[h/l] rS, rA, rB
*FIG. 9*
stmvex2.[s/u].[ms].[ss].[h/l] rS, rA, rB
*FIG. 10*
ststrmvex.[s/u].[ms].[ss].[h/l] rS, rA, rB
*FIG. 11*

← 64 BITS →

| A | B | C | D | R0 |
| E | F | G | H | R1 |
| I | 0 | 0 | 0 | R2 |
|   |   |   |   | R3 |
|   |   |   |   | R4 |
|   |   |   |   | R5 |
|   | ⋮ |   |   | ⋮ |
|   |   |   |   | R31 |

*FIG. 15*

← 64 BITS →

| A | B | C | 0 | R0 |
| D | E | F | 0 | R1 |
| G | H | I | 0 | R2 |
|   |   |   |   | R3 |
| ←IT | ←IU | ←IV | 0 | R4 |
|   |   |   |   | R5 |
|   | ⋮ |   |   | ⋮ |
|   |   |   |   | R31 |

*FIG. 16*

← 64 BITS →

|   |   |   |   | R0 |
| pp | qq | rr | ss | R1 |
| tt | 0 | 0 | 0 | R2 |
|   |   |   |   | R3 |
| pp | rr | tt | 0 | R4 |
|   |   |   |   | R5 |
|   | ⋮ |   |   | ⋮ |
|   |   |   |   | R31 |

| 64 BITS | | | | |
|---|---|---|---|---|
| 0x08 | | | | R1 |
| 0x20 | | | | R2 |
| ⋮ | | | | |
| $C_4$ | $C_3$ | $C_2$ | $C_1$ | R6 |
| $C_0$ | 0 | 0 | $C_0$ | R7 |
| $X_{-4}$ | $X_{-3}$ | $X_{-2}$ | $X_{-1}$ | R8 |
| $X_0$ | 0 | 0 | 0 | R9 |
| $C_4 \cdot X_{-4}+C_3 \cdot X_{-3}+C_2 \cdot X_{-2}+C_1 \cdot X_{-1}$ | | | | R10 |
| $C_0 \cdot X_0 + 0 \cdot 0 + 0 \cdot 0 + 0 \cdot 0$ | | | | R11 |

FIG. 20

| 64 BITS | | | | |
|---|---|---|---|---|
| 0x22 | | | | R2 |
| ⋮ | | | | |
| $C_4$ | $C_3$ | $C_2$ | $C_1$ | R6 |
| $C_0$ | 0 | 0 | $C_0$ | R7 |
| $X_{-3}$ | $X_{-2}$ | $X_{-1}$ | $X_0$ | R8 |
| $X_1$ | 0 | 0 | 0 | R9 |
| $C_4 \cdot X_{-3}+C_3 \cdot X_{-2}+C_2 \cdot X_{-1}+C_1 \cdot X_0$ | | | | R10 |
| $C_0 \cdot X_1 + 0 \cdot 0 + 0 \cdot 0 + 0 \cdot 0$ | | | | R11 |

FIG. 21

| 64 BITS | | | | |
|---|---|---|---|---|
| 0x24 | | | | R2 |
| ⋮ | | | | |
| $C_4$ | $C_3$ | $C_2$ | $C_1$ | R6 |
| $C_0$ | 0 | 0 | $C_0$ | R7 |
| $X_{-2}$ | $X_{-1}$ | $X_0$ | $X_1$ | R8 |
| $X_2$ | 0 | 0 | 0 | R9 |
| $C_4 \cdot X_{-2}+C_3 \cdot X_{-1}+C_2 \cdot X_0+C_1 \cdot X_1$ | | | | R10 |
| $C_0 \cdot X_2 + 0 \cdot 0 + 0 \cdot 0 + 0 \cdot 0$ | | | | R11 |

FIG. 22

| 64 BITS | | | | |
|---|---|---|---|---|
| 0x26 | | | | R2 |
| ⋮ | | | | |
| $C_4$ | $C_3$ | $C_2$ | $C_1$ | R6 |
| $C_0$ | 0 | 0 | $C_0$ | R7 |
| $X_{-1}$ | $X_0$ | $X_1$ | $X_2$ | R8 |
| $X_3$ | 0 | 0 | 0 | R9 |
| $C_4 \cdot X_{-1}+C_3 \cdot X_0+C_2 \cdot X_1+C_1 \cdot X_2$ | | | | R10 |
| $C_0 \cdot X_3 + 0 \cdot 0 + 0 \cdot 0 + 0 \cdot 0$ | | | | R11 |

FIG. 23

← 64 BITS →

| A | B | C | 0 | R1 |
| K | N | Q | 0 | R2 |
| | | | | R3 |
| 0x12 | | | | R4 |
| 0x54 | | | | R5 |

FIG. 24

← 64 BITS →

| D | E | F | 0 | R1 |
| K | N | Q | 0 | R2 |
| | | | | R3 |
| 0x12 | | | | R4 |
| 0x54 | | | | R5 |
| ⋮ | | | | |
| A·K+B·N+C·Q | | | | R10 |
| | | | | R11 |
| | | | | R12 |

FIG. 25

← 64 BITS →

| G | H | I | 0 | R1 |
| K | N | Q | 0 | R2 |
| | | | | R3 |
| 0x12 | | | | R4 |
| 0x54 | | | | R5 |
| ⋮ | | | | |
| A·K+B·N+C·Q | | | | R10 |
| D·K+E·N+F·Q | | | | R11 |
| | | | | R12 |

FIG. 26

← 64 BITS →

| G | H | I | 0 | R1 |
| L | O | R | 0 | R2 |
| | | | | R3 |
| 0x12 | | | | R4 |
| 0x54 | | | | R5 |
| ⋮ | | | | |
| A·K+B·N+C·Q | | | | R10 |
| D·K+E·N+F·Q | | | | R11 |
| G·K+H·N+I·Q | | | | R12 | lmvex_skip_once.[s/u].[ms].[ds] rD, rA, rB

| OPCODE | rD | rA | rB | SUBOPCODE | rB:
| cnt | stride | skip | skip_cnt | lmvex_cb.[s/u].[ms].[ds] rD, rA, rB

| OPCODE | rD | rA | rB | SUBOPCODE | rB:
| buffer_size | offset | lstrmvex_cb.[s/u].[ms].[ds] rD, rA, rB

| OPCODE | rD | rA | rB | SUBOPCODE | rB:
| buffer_size | offset | lmvex_fft.[s/u].[ms].[ds] rD, rA, rB

| OPCODE | rD | rA | rB | SUBOPCODE | rB: | radix |

*FIG. 31* stmvex_fft.[s/u].[ms].[ss] rS, rA, rB

| OPCODE | rD | rA | rB | SUBOPCODE | rB: | radix |

*FIG. 32* lmstrmvex_fft.[s/u].[ms].[ds] rD, rA, rB

| OPCODE | rD | rA | rB | SUBOPCODE | rB: | radix |

*FIG. 33*

|      | 0x0 |   |   |     |     |     |     | 0xE |
|------|-----|---|---|-----|-----|-----|-----|-----|
| 0x0  |     |   |   |     |     |     |     |     |
| 0x10 |     |   |   | $X_0$ | $X_1$ | $X_2$ | $X_3$ | $X_4$ |
| 0x20 | $X_5$ | $X_6$ | $X_7$ |     |     |     |     |     |
| 0x30 |     |   |   |     |     |     |     |     |
| 0x40 |     |   |   | $Y_0$ | $Y_4$ | $Y_6$ | $Y_2$ | $Y_1$ | $Y_5$ |
| 0x50 | $Y_3$ | $Y_7$ |   |     |     |     |     |     |
| 0x60 |     |   |   |     |     |     |     |     |

| $X_0$ | $X_4$ | $X_6$ | $X_2$ | R1 |
|-------|-------|-------|-------|----|
| $X_1$ | $X_5$ | $X_3$ | $X_7$ | R2 |
|       |       |       |       | R3 |
| $Y_0$ | $Y_1$ | $Y_2$ | $Y_3$ | R4 |
| $Y_4$ | $Y_5$ | $Y_6$ | $Y_7$ | R5 |

*FIG. 35*

DATA PROCESSING SYSTEM HAVING INSTRUCTION SPECIFIERS FOR SIMD REGISTER OPERANDS AND METHOD THEREOF

RELATED APPLICATIONS

This is related to U.S. application Ser. No. 10/657,510, filed on even date, and entitled "Data Processing System Using Independent Memory And Register Operand Size Specifiers And Method Thereof," U.S. application Ser. No. 10/657,797, filed on even date, and entitled "Data Processing System Using Multiple Addressing Modes For SIMD Operations and Method Thereof," U.S. application Ser. No. 10/657,593, filed on even date, and entitled "Data Processing System and Method of Providing Memory Operands for a SIMD Processor," and application Ser. No. 09/591,938, filed on Jun. 12, 2000, and entitled "Method and Apparatus for Instruction Execution in a Data Processing System", all of which are assigned to the current assignee hereof.

FIELD OF THE INVENTION

The present invention relates generally to data processing systems, and more specifically, to instructions for use within a data processing system.

RELATED ART

Increased performance in data processing systems can be achieved by allowing parallel execution of operations on multiple elements of a vector. One type of processor available today is a vector processor which utilizes vector registers for performing vector operations. However, vector processors, while allowing for higher performance, also results in increased complexity and cost over processors using scalar general purpose registers. That is, a vector register file within vector processors typically includes N vector registers, where each vector register includes a bank of M registers for holding M elements. For example, in one such vector processor known in the art, the register file includes 32 vector registers where each vector register includes a bank of 32 64-bit registers, thus requiring the equivalent of 1024 64-bit registers.

Another type of processor available today is a single-instruction multiple-data (SIMD) scalar processor (also referred to as a "short-vector machine") which allows for limited vector processing while using any existing scalar general purpose register (GPR). For example, in a data processing system having 32 scalar 64-bit GPRs, each scalar register may be able to hold 2 32-bit elements, 4 16-bit elements, or 8 8-bit elements and thus able to perform 2 32-bit element operations, 4 16-bit operations, or 8 8-bit element operations. Therefore, although the number of elements per operation is limited as compared to vector processors (which can do an operation on 32 64-bit elements in a register bank at once, according to the example provided above), reduced hardware is required. However, in current SIMD scalar processors, there is a large overhead associated with transfers of vector elements to the scalar registers for execution and the transfers of multiple vector elements back to memory. The overhead limits the effective throughput of operations, therefore, a need exists for improved methods of loading and storing multiple vector elements between memory and registers.

BRIEF DESCRIPTION OF THE DRAWINGS

The present invention is illustrated by way of example and not limited by the accompanying figures, in which like references indicate similar elements, and in which:

FIGS. 2-11 illustrate vector load and store instructions that may be executed by the data processing system of FIG. 1, in accordance with various embodiments of the present invention;

FIG. 12 illustrates an example memory portion, in accordance with one embodiment of the present invention;

FIGS. 13-17 illustrate examples of entries within a set of scalar GPRs in accordance with various embodiments of the present invention;

FIGS. 19-26 illustrate examples of entries within a set of scalar GPRs in accordance with various embodiments of the present invention;

FIGS. 27-33 illustrate vector load and store instructions that may be executed by the data processing system of FIG. 1, in accordance with various alternate embodiments of the present invention;

FIG. 34 illustrates an example of a memory portion in accordance with one embodiment of the present invention; and FIG. 35 illustrates an example of entries within a set of scalar GPRs in accordance with one embodiment of the present invention.

Figure 1:
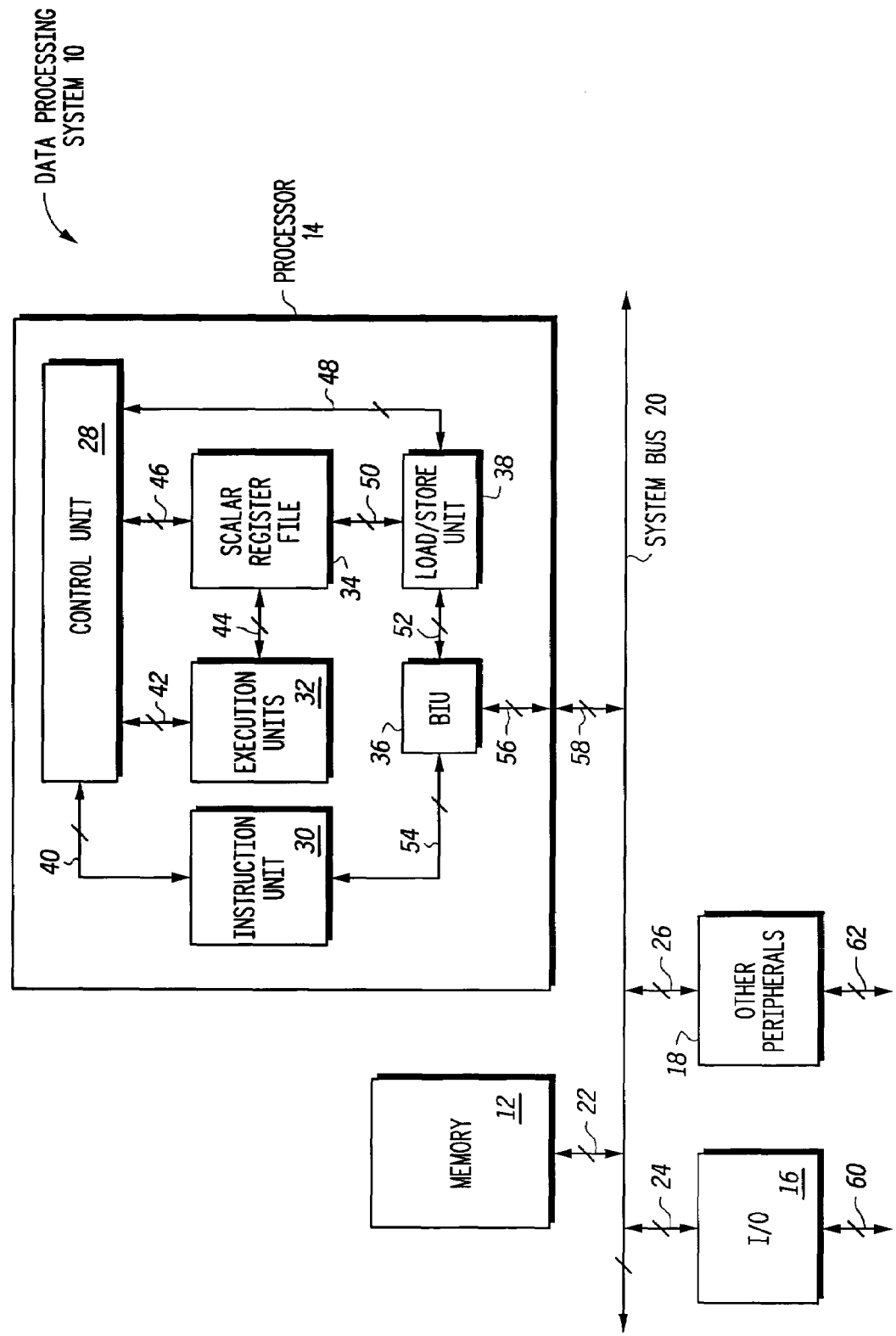
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time-multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Also, note that a "0x" preceding a number indicates that the number is represented in its hexadecimal or base sixteen form. The symbol "%"

preceding a number indicates that the number is represented in its binary or base two form.

As discussed above, a need exists for reducing overhead associated with transfers of multiple vector elements from memory to registers and from registers to memory. Therefore, a variety of different vector load and store instructions will be described herein which allow for the transfers of vector elements to and from memory in an improved manner. Furthermore, the use of the instructions described herein may allow for reduced overhead with minimal additional hardware complexity added to existing designs. For example, a scalar register file, as used within many types of data processing systems, may be used with these instructions, thus not requiring a more costly separate vector register file. Also, the instructions may allow for reduced software complexity while still improving execution efficiency. Also, the instructions herein may be used to address various issues such as the alignment of vector elements in memory, the need to extend the size of memory elements into register elements for increased precision, the arbitrary vector lengths versus the fixed length of registers, or the overhead (e.g. in instruction issue and execution) associated with the number of load/store instructions required to retrieve/store a vector of data. The instructions herein may also be used to address any combination of these issues, or additional issues or combination of issues, as will be understood with the descriptions that will be provided below in reference to FIGS. 1-35.

FIG. 1 illustrates, in block diagram form, a data processing system 10 in accordance with one embodiment of the present invention. Data processing system 10 includes a processor 14, memory 12, input/output (I/O) 16, other peripherals 18, and a system bus 20. Memory 12 is bidirectionally coupled to system bus 20 via conductors 22, I/O 16 is bidirectionally coupled to system bus 20 via conductors 24, other peripherals 18 is bidirectionally coupled to system bus 20 via conductors 26, and processor 14 is bidirectionally coupled to system bus 20 via conductors 58. In one embodiment, other peripherals 18 may include one or more peripherals, where each can be any type of peripheral, such as a universal asynchronous receiver transmitter (UART), a real time clock (RTC), a keyboard controller, other memories, etc. Some or all of other peripherals 18 may be capable of communicating information external to data processing system 10 via conductors 62. I/O circuitry 16 may include any type of I/O circuitry which receives or provides information external to data processing system 10, via, for example, conductors 60. Memory 12 can be any type of memory, such as, for example, a read only memory (ROM), a random access memory (RAM), non-volatile memory (e.g. Flash), etc. Data processing system 10 may include other elements than those illustrated, or may include more or fewer elements than those illustrated. For example, data processing system 10 may include any number of memories or processors.

Processor 14 may be any type of processor, such as, for example, a microprocessor, microcontroller, digital signal processor, etc. In one embodiment, processor 14 may be referred to as a processor core. In another embodiment, processor 14 may be one of many processors in a multi-processor data processing system. Furthermore, although not illustrated as such, processor 14 may be a pipelined processor. In the embodiment illustrated in FIG. 1, processor 14 includes a control unit 28, an instruction unit 30, execution units 32, a scalar register file 34, a bus interface unit (BIU) 36, and a load/store unit 38. Control unit 28 is bidirectionally coupled to instruction unit 30 via conductors 40, to execution units 32 via conductors 42, to scalar register file 34 via conductors 46, and to load/store unit 38 via conductors 48. Execution units 32 are bidirectionally coupled to scalar register file 34 via conductors 44, and scalar register file 34 is bidirectionally couple to load/store unit 38 via conductors 50. BIU 36 is bidirectionally coupled to instruction unit 30 via conductors 54 and to load/store unit 38 via conductors 52. Processor 14 is capable of bidirectionally communicating with system bus 20 via conductors 56 which are coupled to conductors 58. Note that processor 14 may include more circuitry than that illustrated, where the additional circuitry may also be coupled to conductors 58. That is, conductors 56 may communicate with system bus 20 via all or a portion of conductors 58. Note also that all or a portion of processor 14 may be referred to as processing circuitry.

In operation, instruction unit 30 fetches instructions from a memory, such as memory 12, via BIU 36 and system bus 20, and receives and provides control information to and from control unit 28. Instruction unit 30 can be any type of instruction unit as known in the art, and operates as known in the art, and therefore will not be described in more detail herein. Instruction unit 30 therefore provides instructions to control unit 28 which controls execution of these received instructions via, for example, executions units 32 and load/store unit 38, which are both capable of communicating with scalar register file 34, as needed, directly or via control unit 28. For example, control unit 28, via load/store unit 38 and BIU 36, is capable of loading data from memory (such as memory 12) to registers within scalar register file 34 as needed for executing instructions and is capable of storing data from registers within scalar register file 34 to memory (such as memory 12) as needed for executing instructions. For example, in one embodiment, load/store unit 38 can communicate directly with scalar register file 34 (to read and write data) via conductors 50 based on control information provided from control unit 28 via conductors 48. Execution units 32 can perform arithmetic, logical, shifting, or other operations using data stored within scalar register file 34 and store results to registers within scalar register file 34, as required for executing the instructions received from instruction unit 30 by way of control unit 28. Execution units 32 may include, for example, arithmetic logic units (ALUs), floating point units, etc.

Scalar register file 34 includes N general purpose registers (GPRs), where N can be any integer greater than or equal to one. In one embodiment, scalar register file 34 includes 32 64-bit registers. As used here in, a scalar register indicates a register which has a one dimensional map and thus holds only one row of data (e.g. a 1 by M-bit register), where M can be any integer greater or equal to one. In one embodiment, M is 64, and each register is thus capable of storing a 64-bit quantity. Scalar register file 34 can provide or receive control information or data to or from control unit 28 via conductors 46.

Operation of processor 14 is generally understood by one of ordinary skill in the art. Therefore, processor 14 will not be described in more detail herein except for those portions that are needed in understanding the various embodiments described in reference to FIGS. 2-36. Also note that existing designs for data processing systems having operands stored in a scalar general purpose register file can be modified as needed to execute the load and store instructions described here. Furthermore, note that since scalar register files may be used, currently existing designs may be retrofitted to allow for the instructions to be described herein. (However, note that the embodiments described herein may be used with any type of register file and is not limited to only scalar register files.)

FIGS. 2-11 illustrate various different vector elements load and store instructions that may be executed by processing circuitry, such as, for example, by processor 14 of FIG. 1. For example, each instruction can be fetched by instruction unit 30 which provides them, as appropriate, to control unit 28. Control unit 28 can therefore direct load/store unit 38 and execution units 32, as needed, to execute the received instructions, using scalar register file 34 as needed to store data, as will be described in more detail below. Note that examples for using the instructions illustrated in FIGS. 2-11 will be provided in reference to subsequent figures. Also, note that as used herein, a vector element (or register element) refers to an element that can be at most the size of a scalar GPR, but can also be less than the size of a GPR. For example, in the case where scalar register file 34 includes 64-bit registers (M=64), a vector element can be of size 64 bits or less. For example, a vector element may be a byte (8 bits) such that one 64-bit GPR can hold 8 vector elements. Also, a vector element may be a halfword (16 bits) such that one 64-bit GPR can hold 4 vector elements. Similarly, a vector element may be a word (32 bits) such that one 64-bit GPR can hold 2 elements. Also note that as used herein, a byte is denoted by "b", a halfword by "h", and a word by "w". (Note that alternate embodiments, a word or halfword may be defined differently. For example, a word may refer to 16 bits rather than 32 bits. However, as will be used herein, a word refers to 32 bits, for ease of description.)

Figure 2:
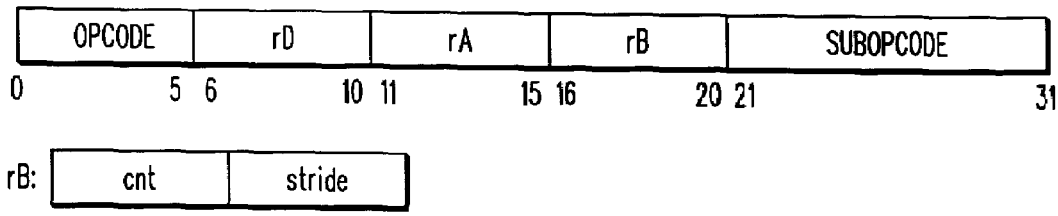

FIG. 2 illustrates a load vector elements (lvex) instruction which loads one destination register in the register file (such as, for example, scalar register file 34) with elements from memory. In one embodiment, additional control fields may be used to further define the operation, such as an s/u field, an ms field, and a ds field, each illustrated in FIG. 2 as following the operator "lvex", separated by periods. In one embodiment, each of these control fields is present; however, in alternate embodiments, some or none of these control fields may be present. In one embodiment, the ms field corresponds to a memory element size field and the ds field corresponds to the destination element size. For example, in one embodiment, the memory element size (ms) field may be set to one of mb, mh, or mw to indicate whether the memory elements to be loaded are bytes, halfwords, or words, respectively. Similarly, the destination element size (ds) field is used to indicate the size each loaded element will have within the destination register.

The lvex instruction of FIG. 2 also includes three operands: rD, rA, and rB. The instruction lvex loads the destination register rD with vector elements from memory. The first element in memory is pointed to by the register rA, and in the embodiment of FIG. 2, additional parameters are specified in register rB. Therefore, each of rD, rA, and rB can indicate one of the GPRs within scalar register file 34. Additional parameters stored in register rB include a count (cnt) value and a stride value, such that the lvex instruction loads register rD with a "cnt" number of elements from memory (the first of which pointed to by rA) into fields of rD having a size ds, such that each destination element in rD is of size ds.

A stride value may also be specified which indicates how the elements in memory are spaced. That is, the elements in memory are spaced "stride" units apart of size ms. For example, if the elements in memory are contiguous, then a stride of 1 can be used to get a "cnt" number of contiguous elements of size "ms". If, for example, the elements are located three elements apart, then a stride of 3 can be used to get a "cnt" number of elements, each spaced 3 units of size "ms" apart from each other. For example, if ms indicates a word (e.g. mw) then a stride of 3 would get every third word in memory starting with the memory location pointed to by rA. Also, note that the stride value may be a signed value where a negative value would get elements at increasingly lower address locations rather than increasingly higher address locations.

In one embodiment, the destination size (ds) should be greater than or equal to the memory element size (ms). If the destination size (ds) is greater than the memory element size (ms), then the s/u field may be used to extend each memory element appropriately. An "s" can be used to indicate that the elements are signed and should therefore be sign-extended, while a "u" can be used to indicate that the elements are unsigned and should therefore be zero-extended. For example, in the case of "lvex.u.mh.dw rD, rA, rB," the upper halfword of each destination location (of size word) within rD would be zeroed, as will be described in more detail below. Also, note that in one embodiment, if "cnt*ds" is less than the size of the destination register rD, then the remaining low order portion of rD is zeroed. Alternatively, any remaining portion of rD, such as, for example, the remaining low order portion of rD may be filled with any predetermined value (such as zero or any other predetermined value). Also, in one embodiment, if ds is less than ms, then each of the elements can be rounded or truncated when loaded into rD (where the lvex instruction may also include a truncation or rounding control field, as will be described below in reference to the store instructions).

In the illustrated embodiment, the s/u field, ms field, and ds field can be encoded as part of the opcode or subopcode. Therefore, in the illustrated embodiment, the lvex instruction includes a field for indicating the opcode, a field for indicating rD, a field for indicating rA, a field for indicating rB, and a field for indicating a subopcode. However, in alternate embodiments, note that the s/u, ms, and ds fields can also be indicated in rB, along with cnt and stride.

Figure 3:
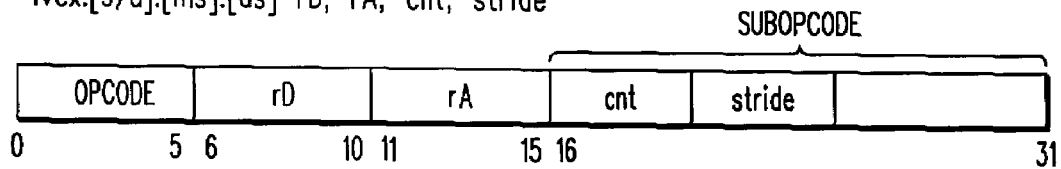

FIG. 3 illustrates an alternate embodiment of the lvex instruction of FIG. 2, where rather than indicating rB as an operand where rB includes the additional parameters, all of the parameters may be provided as all or part of the instruction opcode or subopcode. For example, cnt, stride, and the control fields (s/u, ms, and ds) may all be indicated within the subopcode portion of the instruction.

Note that the descriptions provided above with respect to the control fields s/u, ms, and ds apply to all the load instructions described herein. As with the instruction lvex, all, some, or none of these control fields may be present in the other load instructions described herein. Note also that for the discussions herein, rD generally refers to the destination register, rA points to the first memory element in memory, and rB, if present in the instruction, stores some or all additional parameters for the instruction. Note that rB may also be referred to as a control register and need not be one of the GPRs. Similarly, rA can be a control register or another memory location and need not be one of the GPRs. Also note that in all the instructions (load and store) described herein, the control fields can either be encoded as part of the opcode or subopcode of the instruction or may be located in register rB. If they are located within register rB, then the control fields will generally not appear following the operator, separated by periods, but will only appear in register rB. Also, note that if more parameters or control fields are needed, any of the instructions herein may indicate more than one register for indicating instruction parameters and control fields if necessary, or the additional information may be contained in either common or disjoint storage locations.

Figure 4:
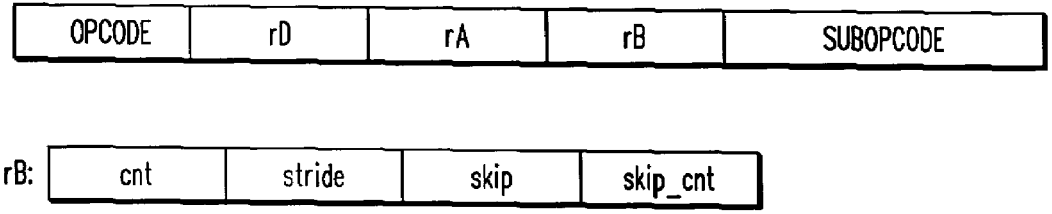

FIG. 4 illustrates a load multiple vector elements (lmvex) instruction which loads multiple destination registers with elements from memory. As with the lvex instruction, the lmvex instruction may also include an s/u field, an ms field, and a ds field, each illustrated in FIG. 4 as following the operator "lmvex", separated by periods. The lmvex instruction of FIG. 4 also includes three operands: rD, rA, and rB. The instruction lmvex loads the first destination register rD, and as many registers following rD as needed, with a "cnt" number of vector elements from memory (where the first element in memory is pointed to by register rA), such that each destination element in any of the destination registers is of size ds. For example, if 9 elements of size halfword (16 bits) are to be loaded into rD (where each of the GPRs is 64 bits), then 3 GPRs are needed. In one embodiment, rD indicates the first register, and if more are needed, then additional contiguous registers are used. For example, if rD indicates register R4 for the 9 elements, then registers R4, R5, and R6 are used.

Additional parameters stored in register rB include cnt, stride, skip, and skip_cnt. The parameters cnt and stride are the same as described above in reference to FIG. 1. That is, elements in memory to be loaded may be located "stride" units of size ms apart. The lmvex instruction loads elements from memory spaced a "stride" number of units apart (of size ms) until a "skip_cnt" number of elements has been fetched. At this point, the next element is located at a "skip" number of units of size ms away and the mechanism (such as, for example, a counter) keeping track of skip_cnt is reset. Therefore, each time a skip_cnt number of elements has been fetched (since the start of the instruction or since the last time skip_cnt counter was reset), the next element is located at a "skip" number (rather than a "stride" number) of units of size ms away. In one embodiment, a counter within processor 14 (such as, within control unit 28) is set "skip_cnt−1" and is decremented after each fetch until the counter expires (reaches zero), and is again reset to "skip_cnt−1" to continue fetching elements located at "skip" number of units away until a "cnt" number of elements has been fetched. (Alternatively, the counter can be set to zero and incremented each time until the counter reaches skip_cnt−1. Alternate embodiments may use other methods for keeping track of skip_cnt.) Note that both stride and skip can be signed quantities. Also, in one embodiment, any remaining unfilled bytes in the last destination register used are filled with a predetermined value (such as, for example, zero) after loading the "cnt" number of elements from memory.

In one embodiment, the destination size (ds) should be greater than or equal to the memory element size (ms). If the destination size (ds) is greater than the memory element size (ms), then the s/u field may be used to extend each memory element appropriately, as was described above in reference to lvex. However, in one embodiment, if ds is less than ms, then each of the elements can be rounded or truncated when loaded into rD, as will be described below in reference to the store instructions.

Figure 5:
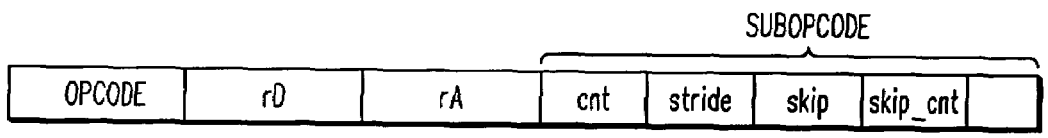

FIG. 5 illustrates an alternate embodiment of the lmvex instruction of FIG. 4, where rather than indicating rB as an operand where rB includes the additional parameters, all of the parameters may be provided as all or part of the instruction subopcode. For example, cnt, stride, skip, skip_cnt, and the control fields (s/u, ms, and ds) may all be indicated within the subopcode or opcode portion of the instruction. In yet another alternate embodiment (not shown), individual instruction parameters may be allocated to either an instruction field or a field within rB. Allocation to a field within rB may be used, for example, when it is desired to have the parameter be capable of dynamic modification based on the result of computations, or based on system state. Other parameters may be of a static nature, and may thus be encoded into a field within the instruction.

Note that for the remaining instructions described herein, any additional parameters will be located in rB where rB is provided as an operand to the instruction. However, it should be understood that in alternate embodiments, the instructions may have different formats, as have been described above.

FIG. 6 illustrates another load multiple vector elements (lmvex2) instruction which also loads multiple destination registers with elements from memory. As with the above described instructions, the lmvex2 instruction may also include an s/u field, an ms field, and a ds field, each illustrated in FIG. 6 as following the operator "lmvex2", separated by periods. The lmvex2 instruction of FIG. 6 also includes three operands: rD, rA, and rB. The instruction lmvex2 loads the destination register rD (and as many registers following rD as needed) with a "cnt" number of vector elements from memory (where the first element in memory is pointed to by register rA), such that each destination element in any of the destination registers is of size ds. For example, if 9 elements of size halfword (16 bits) are to be loaded into rD (where each of the GPRs is 64 bits), then at least 3 GPRs are needed, and as will be described further, additional GPRs beyond 3 may also be needed. In one embodiment, rD indicates the first register, and if more are needed, then additional continuous registers are used. For example, if rD indicates register R4 for the 9 elements, then at least registers R4, R5, and R6 are used.

Additional parameters for lmvex2 stored in register rB include cnt, rcnt, stride, and skip. The parameters cnt and stride are the same as described above in reference to lmvex. That is, elements in memory to be loaded may be located "stride" units of size ms apart, and cnt defines the total number of elements to be loaded. The rcnt parameter defines the maximum number of destination elements to be loaded into each register. (Therefore, the total number of registers needed is dependent on both cnt and rcnt.) The lmvex2 instruction loads a "cnt" total number of elements from memory into one or more destination registers (as many as needed) where only an "rcnt" number of elements is loaded into each destination register. (Therefore, in one embodiment, rcnt is less than or equal to the total number of destination elements of size ds which can be contained within a single GPR, and rcnt is also less than or equal to cnt.)

For example, the lmvex2 instruction loads elements from memory spaced a "stride" number of units apart (of size ms) into a destination register (rD) until an "rcnt" number of elements has been fetched into a single register. At this point, if a "cnt" number of total elements still has not been fetched, the next element is located at "skip" number of units of size ms away. Elements from memory locations spaced a "stride" number of units apart (of size ds) are then loaded into another destination register (such as, for example, rD+1) until an "rcnt" number of elements has been fetched into that destination register (or until a "cnt" number of elements has been fetched, whichever occurs first). If, after an "rcnt" number of elements has been fetched, a "cnt" number of elements still has not been fetched, then loading continues with the next element located at "skip" number of units away into, for example, rD+2. When a "cnt" number of elements has been reached, loading stops. Therefore, note that elements in memory for a given destination register are spaced "stride" ms units apart, and elements for successive registers are fetched after adding "skip" units of size ms to the address of the last element of the previous destination register. Note also that both stride and skip may be signed quantities, allowing for negative strides and skips.

Note that in an alternate embodiment, a skip_cnt parameter may be used, such that after a skip_cnt number of elements has been fetched, the next element is located a "skip" number of units of size ms away. In this manner, after an "rcnt" number of elements has been loaded into a destination register, the next element for a successive register is fetched based on skip, if a skip_cnt number of elements has been loaded, or based on stride, if a skip_cnt number of elements has not yet been loaded since the start of the instruction or since skip_cnt was last reset.

As described above in reference to lvex, a counter within processor 14 (such as, within control unit 28) may be used to keep track of "cnt" during loading of vector elements. Similarly, a counter within processor 14 may also be used to keep track of "rcnt" during the loading of each destination register. Alternate embodiments may use other methods for keeping track of cnt and rcnt. Also, in one embodiment, any remaining bytes in each destination register after an "rcnt" number of elements have been loaded are filled with a predetermined value, such as, for example, zero. Also, in one embodiment, the remaining bytes in the last destination register used are filled with a predetermined value (such as, for example, zero) after loading the "cnt" number of elements from memory.

In one embodiment, the destination size (ds) should be greater than or equal to the memory element size (ms). If the destination size (ds) is greater than the memory element size (ms), then the s/u field may be used to extend each memory element appropriately, as was described above in reference to the above instructions. However, in one embodiment, if ds is less than ms, then each of the elements can be rounded or truncated when loaded into rD as will be described below in reference to the store instructions.

FIG. 7 illustrates a load stream of vector elements (lstrmvex) instruction which initiates loading of a stream of vector elements from memory into a named stream associated with a destination register. As with the above described instructions, the lstrmvex instruction may also include an s/u field, an ms field, and a ds field, each illustrated in FIG. 7 as following the operator "lstrmvex", separated by periods. The lstrmvex instruction of FIG. 7 also includes three operands: rD, rA, and rB. Additional parameters for the lstrmvex instruction include cnt, rcnt, stride, skip, and skip_cnt. The parameters cnt, rcnt, stride, skip, and skip_cnt are generally the same as described above in reference to lvex, lmvex, and lmvex2.

The lstrmvex instruction loads multiple instances of rD with a "cnt" number of total elements from memory (where the first element in memory is pointed to by register rA), such that each destination element in the destination register is of size ds. The values of cnt and rcnt determine the number of instances of rD targeted. The lstrmvex instruction loads vector elements from memory spaced "stride" units of size ms apart, until a "skip_cnt" number of elements has been fetched. At this point, "skip*ms" is added to the address of the last element fetched (instead of "stride*ms") to obtain the address of the next element to be loaded. Also, at this point, a mechanism (such as, for example, a counter) keeping track of skip_cnt is reset. Therefore, each time a "skip_cnt" number of elements has been fetched (since the start of the instruction or since the last time the skip_cnt counter was reset), the location of the next element is indicated by the "skip" rather than "stride" parameter.

The "rcnt" parameter defines the number of destination elements per register instance. (Therefore, in one embodiment, rcnt is less than or equal to the total number of destination elements of size ds within a single GPR, and rcnt is less than or equal to cnt.) For example, the lstrmvex instruction loads elements from memory (according to the parameters stride, skip, and skip_cnt, described above) into rD (i.e. a first instance of rD) until an "rcnt" number of elements has been fetched. At this point, if a "cnt" number of elements still has not been fetched, the next element is located at a "stride" number of units of size ms away (or, if a skip_cnt number of elements has been fetched, then the next element is located at a "skip" rather than "stride" number of units of size ms away). The lstrmvex instruction then continues to load elements from memory (according to the parameters stride, skip, and skip_cnt) into a different instance of rD (i.e. a second instance of rD, overwriting the previous values of rD) until an "rcnt" number of elements has been fetched (or until a "cnt" number of elements has been fetched, whichever occurs first). If, after an "rcnt" number of elements has been fetched and a "cnt" number of elements still has not been fetched, then loading continues with the next element into rD (another instance of rD). When a "cnt" number of elements has been fetched, loading stops. Each instance of rD corresponds to a unique set of rcnt elements fetched from memory. As each instance of rD is dequeued, the next instance is loaded with the next set of rcnt elements in the stream of elements until a total cnt number of elements of the stream have been loaded.

In one embodiment, instances of rD are dequeued based on the use or location of rD in a subsequent instruction. For example, in one embodiment, an instance of rD is dequeued if rD is used as a particular source register in a subsequent instruction. Therefore, after that subsequent instruction is executed (with rD as a the particular source register), the next "rcnt" number of elements will be loaded into rD (assuming a "cnt" number of elements still has not been reached). However, if rD is not used as the particular source register (e.g., if it is a different source register or it is a destination register), then rD is not dequeued and the next "rcnt" number of elements is not yet loaded into rD. In an alternate embodiment, the option of dequeueing or not is indicated in other ways, such as, for example, by a flag within the instruction, or by using different opcodes (such as, for example, corresponding to a special subset of instructions which calls for dequeueing). Examples of the optional dequeueing will be described below in reference to FIGS. 23-26.

As described above in reference to the above instructions, a counter within processor 14 (such as, within control unit 28) may be used to keep track of "cnt" during loading of vector elements. Similarly, a counter within processor 14 may also be used to keep track of "rcnt" during the loading of each destination register. A counter may also be used to keep track of skip_cnt. Alternate embodiments may use other methods for keeping track of cnt, rcnt, and skip_cnt. Also, in one embodiment, any remaining bytes in each destination register or register instance after an "rcnt" number of elements have been loaded are filled with a predetermined value, such as, for example, zero. Also, in one embodiment, the remaining bytes in the last destination register or register instance used are filled with a predetermined value (such as, for example, zero) after loading the "cnt" number of elements from memory. Note also that both stride and skip may be signed quantities, allowing for negative strides and skips.

In one embodiment, the destination size (ds) should be greater than or equal to the memory element size (ms). If the destination size (ds) is greater than the memory element size (ms), then the s/u field may be used to extend each memory element appropriately, as was described above in reference to the above instructions. However, in one embodiment, if ds is less than ms, then each of the elements can be rounded or truncated when loaded into rD.

Note that in alternate embodiments, each of the individual parameters of the lstrmvex instruction may be optional, and this may also be the case with alternate embodiments of other instructions described herein, such as the lvex, lmvex, and lmvex2 instructions.

FIG. 8 illustrates a store vector elements (stvex) instruction which stores elements to memory from a source register. The stvex instruction may be considered the store counterpart of the lvex instruction. In one embodiment, the stvex instruction uses additional control fields, such as an s/u field, an ms field, a ss field, and an h/l field, each illustrated in FIG. 8 as following the operator "stvex", separated by periods. In one embodiment, each of these control fields is present; however, in alternate embodiments, only some or none of these control fields may be present. In one embodiment, the s/u field (sign or unsigned extend) and the ms field (memory size) are the same as those described above in reference to the load instructions. In one embodiment, the ss field corresponds to a source element size field which indicates the size of each source element in the source register. For example, in one embodiment, the ss field may be set to one of sb, sh, or sw to indicate whether the source elements to be stored to memory are bytes, halfwords, or words, respectively.

The stvex instruction of FIG. 8 also includes three operands: rS, rA, and rB. In the embodiment of FIG. 8, additional parameters are specified in register rB, where these additional parameters include cnt and stride. (Therefore, as with the load instructions above, each of rS, rA, and rB can indicate one of the GPRs within scalar register file 34.) The stvex instruction stores a "cnt" number of elements of size ss from source register rS to memory, where the first element is to be stored at a memory location pointed to by the register rA, such that each destination element in memory has a size ms (and is optionally truncated or extended, as indicated by the s/u and h/l fields).

A stride value may also be specified which indicates how the elements in memory are to be spaced. That is, the elements in memory, when stored, are to be spaced "stride" units of size ms apart. For example, a stride of 1 can be used to store a "cnt" number of contiguous elements of size "ms". Similarly, a stride of 3 can be used to store a "cnt" number of elements of size "ms" to memory, each spaced 3 units of size "ms" apart from each other. Also, note that the stride value may be a signed value.

In one embodiment, the h/l field is a truncation control field. For example, if ss is greater than ms (i.e. the source size is greater than the memory size), then the h/l field can be used to indicate how the source elements are to be truncated. For example, if the h/l field is an "h" then the low order portion of the source elements are truncated. However, if the h/l field is an "l" then the high order portion of the source elements are truncated. Note that in alternate embodiments, the stvex instruction may also include a rounding control field (in addition to or instead of the truncation control field) such that if, for example, ss is greater than ms, the values may be rounded rather than truncated. For example, in one embodiment, a high order portion of the source element maybe rounded based on a value of a low order portion of the source element.

In one embodiment, if the source element size (ss) is less than the memory element size (ms), then the s/u field may be used to extend each source element appropriately when stored into memory. An "s" can be used to indicate that the elements are signed and should therefore be sign-extended, while a "u" can be used to indicate that the elements are unsigned and should therefore be zero-extended.

In the illustrated embodiment, the s/u field, ms field, ss field, and the h/l field of any of the store instructions described herein can be encoded as part of the opcode or subopcode. Therefore, in the illustrated embodiment, the stvex instruction includes a field for indicating the opcode, a field for indicating rS, a field for indicating rA, a field for indicating rB, and a field for indicating a subopcode. However, in alternate embodiments, note that the s/u, h/l, ms, and ss fields can also be indicated in rB, along with cnt and stride. Also, as with the load instructions, each of the additional parameters may also be encoded as part of the opcode or subopcode, without needing to specify a register such as rB. Therefore, note that in alternate embodiments, any of the store instructions described herein may also have a variety of different formats. Also, note that the store instructions will be described in reference to having any additional parameters stored in a register rB. (As mentioned above, multiple registers or storage locations can be indicated in the instruction if additional parameters and control fields are needed.)

Note that the descriptions provided above with respect to the control fields s/u, ms, ss, and h/l apply to all the store instructions described herein. As with the instruction stvex, all, some, or none of these control fields may be present in the other store instructions described herein. Note also that for the discussions herein, rS generally refers to the source register, rA points to the location in memory where the first element is to be stored, and rB, if present in the instruction, holds some or all additional parameters for the instruction.

FIG. 9 illustrates a store multiple vector elements (stmvex) instruction which stores elements to memory from multiple source registers. The stmvex instruction may be considered the store counterpart of the lmvex instruction. In one embodiment, the stmvex instruction uses additional control fields, such as an s/u field, an ss field, a ds field, and an h/l field, each illustrated in FIG. 9 as following the operator "stmvex", separated by periods. The descriptions provided above for these fields with respect to stvex instruction also apply here to the stmvex instruction.

The stmvex instruction of FIG. 9 also includes three operands: rS, rA, and rB. In the embodiment of FIG. 9, additional parameters are specified in register rB, where these additional parameters include cnt, stride, skip, and skip_cnt. The stmvex instruction stores a "cnt" number of elements of size ss from multiple source registers rS (and registers subsequent to rS, such as rS+1, rS+2, as needed) to memory, where the address of the first element to be stored is pointed to by the register rA, and such that each element in memory has a size ms (and is optionally truncated or extended, as indicated by the s/u and h/l fields).

As with stvex, the stride value may indicate how the elements in memory are to be spaced. Therefore, source elements from rS are stored to memory such that they are located a "stride" number of units (of size ms) apart until a "skip_cnt" number of elements have been stored. At this point, "skip*ms" is added to the address of the last element stored (instead of "stride*ms") to obtain the address of the next element to be stored. Also, at this point, the mechanism (such as, for example, a counter) used to keep track of skip_cnt is reset. Therefore, each time a "skip_cnt" number of elements has been stored (since the start of the instruction or since the last time the skip_cnt counter was reset), the location of the next element to be stored is indicated by the skip parameter rather than the stride parameter. After source elements from rS are stored to memory, source elements from a next source register (such as, for example, rS+1) are stored to memory based on the stride, skip, and skip_cnt parameters until a "cnt" number of elements have been stored.

As described above in reference to the load instructions, counters within processor 14 (such as in control unit 28) may be used to appropriately keep track of cnt and skip_cnt. For example, a counter may be used to indicate a skip_cnt number of elements, where after a skip_cnt number of elements has been stored, the counter is reset and a next skip_cnt number of elements is stored at a location whose start is indicated by skip. This may continue, for example, until a cnt number of elements have been stored (which may be indicated, for example, by another counter). Alternate embodiments may use other method of keeping track of cnt and skip_cnt.

Note that, in one embodiment, if ss is less than ms, then each source element is extended appropriately, as indicated by the s/u field (as described in reference to stvex), to create a memory destination element. Also, in one embodiment, if ss is greater than ms, then each source element is truncated appropriately, as indicated by the h/l field (as described in reference to stvex), to create a memory destination element.

FIG. 10 illustrates another store multiple vector elements (stmvex2) instruction which stores elements to memory from multiple destination registers. The stmvex2 instruction may be considered the store counterpart of the lmvex2 instruction. In one embodiment, the stmvex2 instruction uses additional control fields, such as an s/u field, an ss field, a ds field, and an h/l field, each illustrated in FIG. 10 as following the operator "stmvex2", separated by periods. The descriptions provided above for these fields with respect to the stvex and stmvex instructions also apply here to the stmvex2 instruction.

The stmvex2 instruction of FIG. 10 also includes three operands: rS, rA, and rB. In the embodiment of FIG. 10, additional parameters are specified in register rB, where these additional parameters include cnt, rcnt, stride, and skip. The stmvex2 instruction stores a "cnt" number of elements of size ss from multiple source registers rS (and registers subsequent to rS, such as rS+1, rS+2, as needed) to memory, where the address of the first element to be stored is pointed to by the register rA, and such that each element in memory has a size ms (and is optionally truncated or extended, as indicated by the s/u and h/l fields). The rcnt parameter defines the number of source elements per source register to be stored, and the cnt parameter defines the total number of elements to be stored.

As with stmvex, the stride value may indicate how the elements in memory are to be spaced. Therefore, source elements from rS are stored to memory such that they are located a "stride" number of units (of size ms) apart. In one embodiment, after storing an "rcnt" number of elements from a given source register (rS), if remaining elements are to be stored, then "skip*ms" is added to the address of the last element stored (instead of "stride*ms") to obtain the address of the next element. An "rcnt" number of source elements from a next source register (such as, for example, rS+1) is then stored to memory using the indicated "stride" value. This continues until a "cnt" number of elements has been stored. Note that, in one embodiment, if "rcnt*ss" is less than the size of the source register, then the remaining low order portion of each source register is ignored. Note also that "stride" and "skip" may be signed quantities, thus allowing for negative strides and skips.

Note that in an alternate embodiment, a skip_cnt parameter may also be used, such that after a skip_cnt number of elements has been stored, the next element is located a "skip" number of units of size ms away (rather than a "stride" number of units of size ms away). In this manner, after an "rcnt" number of elements has been stored to memory, the next element from a successive register is stored to a location in memory based on skip, if a skip_cnt number of elements has been stored, or based on stride, if a skip_cnt number of elements has not yet been stored since the start of the instruction or since skip_cnt was last reset.

As described above in reference to the load instructions, counters within processor 14 (such as in control unit 28) may be used to appropriately keep track of cnt and rcnt. Alternate embodiments may use other method of keeping track of cnt and rcnt.

Note that, in one embodiment, if ss is less than ms, then each source element is extended appropriately, as indicated by the s/u field (as described in reference to stvex), to create a memory destination element. Also, in one embodiment, if ss is greater than ms, then each source element is truncated appropriately, as indicated by the h/l field (as described in reference to stvex and stmvex), to create a memory destination element. Rounding may also be optionally specified as described earlier in reference to the stvex instruction.

FIG. 11 illustrates a store stream of vector elements (ststrmvex) instruction which initiates storing a stream of vector elements to memory from a named stream. The ststrmvex instruction may be considered the store counterpart of the lstrmvex instruction. In one embodiment, the ststrmvex instruction uses additional control fields, such as an s/u field, an ss field, a ds field, and an h/l field, each illustrated in FIG. 11 as following the operator "ststrmvex", separated by periods. The descriptions provided above for these fields with respect to the stvex, stmvex, and stmvex2 instructions also apply here to the ststrmvex instruction.

The ststrmvex instruction of FIG. 11 also includes three operands: rS, rA, and rB. In the embodiment of FIG. 11, additional parameters are specified in register rB, where these additional parameters include cnt, rcnt, stride, skip, and skip_cnt. The ststrmvex instruction stores multiple instances of source register rS with "cnt" total elements to memory, where the address of the first element to be stored is pointed to by rA. The "cnt" parameter therefore defines the total number of elements to be stored, and the "rcnt" parameter defines the number of source elements per instance of the source register rS. The ststrmvex instruction stores elements from rS (i.e. a first instance of rS) to memory such that they are spaced a "stride" number of units (of size ms) apart until a "skip_cnt" number of elements have been stored. At this point, "skip*ms" is added to the address of the last element stored (instead of "stride*ms") to obtain the address of the next element. Also, at this point, the mechanism (such as, for example, a counter) keeping track of skip_cnt is reset. Therefore, each time a "skip_cnt" number of elements has been stored (since the start of the instruction or since the last time the skip_cnt counter was reset), the location of the next element is indicated by the skip parameter rather than the stride parameter.

Also, after storing an "rcnt" number of elements from a given instance of rS, if elements remain to be stored (i.e., a "cnt" number of elements has not been stored), then "stride*ms" is added to the address of the last element stored (unless a "skip_cnt" number of elements has been stored, in which case "skip*ms" rather than "stride*ms" is added to the address of the last element stored) to obtain the address of the first element to be stored from a next instance of rS (stored, for example, after execution of an instruction in which rS is used as the destination register). For example, in one embodiment, instances are enqueued when rS is used as a destination register for an instruction. For example, if rS is used as a destination register for a subsequent instruction, and a "cnt" number of elements has not yet been stored, then an "rcnt" number of elements from rS, the destination register of the subsequent instruction (including, for example, all or a portion of the results of the subsequent instruction), is stored to memory, according to the stride, skip, and skip_cnt parameters. In this embodiment, if rS is not used as a destination register of an instruction then it is not enqueued (and thus not stored as part of the vector stream) upon executing that instruction. In alternate embodiments, other mechanisms, such as a flag in the instruction, or opcode (such as, for example, corresponding to a special subset of instructions which calls for enqueueing), may be used to indicate whether an instance of rS is to be enqueued.

Note that, in one embodiment, if "rcnt*ss" is less than the size of the source register, then the remaining low order portion of the source register is ignored. Note also that "stride" and "skip" may be signed quantities, thus allowing for negative strides and skips.

As described above in reference to the load instructions, counters within processor 14 (such as in control unit 28) may be used to appropriately keep track of cnt, rcnt. skip, and skip_cnt. Alternate embodiments may use other method of keeping track of these parameters.

Note that, in one embodiment, if ss is less than ms, then each source element is extended appropriately, as indicated by the s/u field (as described in reference to stvex), to create a memory destination element. Also, in one embodiment, if ss is greater than ms, then each source element is truncated appropriately, as indicated by the h/l field (as described in reference to stvex and stmvex), to create a memory destination element. Alternatively, rounding may be used to create a memory destination element.

Figures 12, 13, 14:
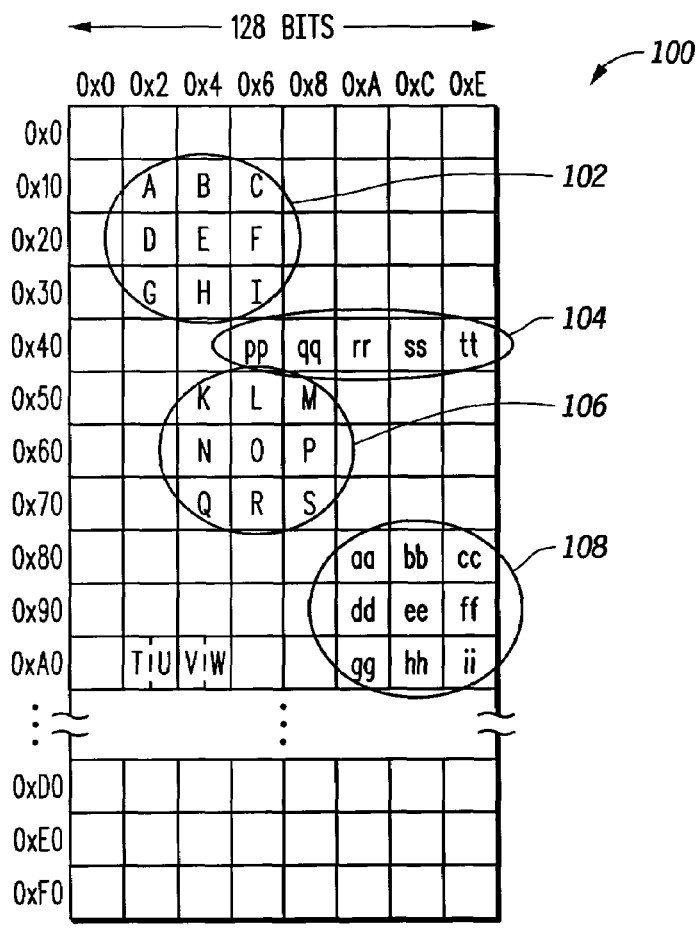

Examples of various different load instructions described above will be described in reference to FIGS. 12-16. FIG. 12 illustrates a portion 100 of a memory which may correspond, for example, to all or a portion of memory 12 of FIG. 1. Memory portion 100 is shown for ease of description as a 128-bit wide memory, although the actual configuration in a given embodiment may differ. For example, memory portion 100 includes a matrix 102 having a first row stored at locations 0x12-0x16 (corresponding to halfwords A, B, and C), a second row stored at locations 0x22-0x26 (corresponding to halfwords D, E, and F), and a third row stored at locations 0x32-0x36 (corresponding to halfwords G, H, and I). Memory portion 100 includes a matrix 106 having a first row stored at locations 0x54-0x58 (corresponding to halfwords K, L, and M), a second row stored at locations 0x64-0x68 (corresponding to halfwords N, O, and P), and a third row stored at locations 0x74-0x78 (corresponding to halfwords Q, R, and S). Memory portion 100 includes a matrix 108 having a first row stored at locations 0x8A-0x8E (corresponding to halfwords aa, bb, and cc), a second row stored at locations 0x9A-0x9E (corresponding to halfwords dd, ee, and ff), and a third row stored at locations 0xAA-0xAE (corresponding to halfwords gg, hh, and ii). Memory portion 100 includes a vector 104 stored at locations 0x46-0x4E, corresponding to halfwords pp, qq, rr, ss, and tt). Memory portion 100 also includes byte-size elements T, U, V, and W stored at locations 0xA2, 0xA3, 0xA4, and 0xA5, respectively.

Note that in alternate embodiments, memory portion 100 may be addressed differently. Also, memory portion 100 may be of any size and may hold any type of information, and may be located anywhere within a data processing system.

The load and store instructions described above may be used to perform, for example, matrix operations when the matrices are stored as matrices 102 and 106 in FIG. 12. That is, note that each of matrices 102 and 106 is stored as a 3 by 3 2-dimensional array. Also, in one embodiment, the result of the matrix operation may also be stored in the same format, as a 3 by 3 2-dimensional array, such as matrix 108. Therefore, note that the following pseudo-code may be used to perform the addition of the first rows of matrix 102 and matrix 106 to obtain the resulting first row matrix 108.

```
/*R7 stores 0x12 and R8 stores a cnt value of 3 and a stride
  value of 1*/
lvex.u.mh.dh    R0, R7, R8
/*R9 stores 0x54 and R10 stores a cnt value of 3 and a stride
  value of 1*/
lvex.u.mh.dh    R1, R9, R10
add.h   R2, R0, R1  /*adds four independent halfword elements in
R0 and R1 and stores results into R2*/
/*R11 stores 0x8A and R12 stores a cnt value of 3 and stride
  value of 1*/
stvex.u.mh.sh   R2, R11, R12
```

Note that in this example, R7 stores the starting address (0x12) of the first row of matrix 102, and R8 is used as rB to store the cnt and stride parameters that were described above in reference to FIGS. 2 and 3. Similarly, R9 stores the starting address (0x54) of the first row of matrix 106, and r10 is used as rB to store the cnt and stride parameters. R11 is used to store the location at which the first element of R2 is to be stored (0x8A) and R12 is used to store the cnt and stride parameters.

FIG. 13 illustrates a register file (such as, for example, scalar register file 34 of FIG. 1) after execution of the above pseudo-code. Note that A, B, and C of matrix 102 is loaded into R0 with execution of the first lvex instruction, with the last field of R0 being filled with a predetermined value (e.g. zero in the current embodiment). Similarly, K, L, and M of matrix 106 is loaded into R1 with execution of the second lvex instruction. Therefore, note that each of the first rows of the matrices may be easily loaded with just a single instruction which allows for cnt and stride to be specified. The add.h instruction adds four independent halfword elements in R0 and R1, and places the four resulting halfword elements into R2. Note that since the lvex instructions allowed for the filling of the last unused fields of R0 and R1 with zero (because cnt*ds was less than 64 bits, the width of R0 and R1), the addition of the two registers resulted in a zero in the unwanted field of R2. In this manner, rather than having an unknown value in the unwanted field of R2 (or having an undesired exceptional condition occur due to the addition of unknown values), it is known to be a predetermined value (zero, in this example). The first 3 fields of R2 are then stored to memory using the stvex instruction such that aa=A+K, bb=B+L, and cc=C+H.

The addition of matrices 102 and 106 can then be completed by the following pseudo-code.

```
add         R7, 0x10    /*R7 now stores 0x22*/
add         R9, 0x10    /*R9 now stores 0x64*/
add         R11, 0x10   /*R11 now stores 0x9A*/
lvex.u.mh.dh    R0, R7, R8
lvex.u.mh.dh    R1, R9, R10
add.h           R2, R0, R1
stvex.u.mh.sh   R2, R11, R12
add         R7, 0x10    /*R7 now stores 0x32*/
add         R9, 0x10    /*R9 now stores 0x74*/
add         R11, 0x10   /*R11 now stores 0xAA*/
lvex.u.mh.dh    R3, R7, R8
lvex.u.mh.dh    R4, R9, R10
add.h           R5, R0, R1
stvex.u.mh.sh   R5, R11, R12
```

The first three add instructions increment the values of R7, R9, and R11, such that they each point to the first element of the second row of each of matrices 102, 106, and 108, respectively. FIG. 14 illustrates the register file of FIG. 13 after execution of the above code. After the first two lvex instructions, D, E, and F are loaded into R0, and N, O, and P are loaded into R1. The add.h instruction adds four independent halfword elements in R0 and R1, and places the four resulting halfword elements into R2. The result is then stored by the stvex instruction to memory in matrix 108 such that dd=D+N, ee=E+O, and ff=F+P. The fifth through seventh add instructions again increment the values of R7, R9, and R11 such that they each point to the first element of the third row of each of matrices 102, 106, and 108, respectively. Note that the lvex instructions for loading the third rows of matrices 102 and 106 load them into R3 and R4, respectively, rather than R0 and R1. It should be understood that alternate embodiments may use any of the registers, as needed, for performing the operations. For example, the same registers (such as R0 and R1) may be continuously overwritten or different registers (such as R3 and R4) may be used. The last store instruction stores the result into matrix 108 such that gg=G+Q, hh=H+R, and ii=I+S.

Note that in alternate embodiments, different code and instructions may be used to add matrices 102 and 106 and store the results into 108. For example, the above pseudo-code could have been written in a loop such that the two lvex and one stvex instructions for each row of the matrices is in the loop body, where the loop is performed 3 times, one for each row. Alternatively, different vector load and store instructions could have been used to bring in all of matrix 102 or matrix 106 into the register file at once. This could have been accomplished, for example, using the lmvex or lmvex2 instructions. For example, FIGS. 15 and 16 illustrate two examples of loading matrix 102 into registers R0, R1, and R2.

FIG. 15 illustrates a register file after loading of matrix 102 using, for example, an lmvex instruction. In the following lmvex instruction, it is assumed that R7 points to the start of matrix 102 (R7 stores 0x12) and that R8 corresponds to rB which stores a cnt value of 9, a stride value of 1, a skip value of 6, and a skip_cnt value of 3. Therefore, the following instruction may be used:

```
lmvex.u.mh.dh    R0, R7, R8 /*cnt = 9, stride = 1, skip = 6, and skip_cnt = 3 */
```

Therefore, as illustrated in FIG. 15, elements A, B, and C are loaded into R0, each continuous in memory since the elements are located "stride*ms" or 1 halfword apart. Then, since a skip_cnt number of elements has been loaded (i.e. 3), the next element, D, located at "skip*ms" (i.e. 6 halfwords) away rather than at "stride*ms" (i.e. 1 halfword) away is loaded as the fourth element of R0. Then elements E and F are loaded into R1, the register subsequent to R0, until again a skip_cnt number of elements has been loaded, thus requiring a "skip" to the next element, G, located 6 halfwords away. This continues until a "cnt" number of elements is loaded. Therefore, the last element, I, is loaded into the first field of R2. Note that the remaining fields of R2 are filled with a predetermined value (zero, in this example).

FIG. 16 illustrates a register file after loading of matrix 102 using, for example, an lmvex2 instruction in which a cnt, rcnt, skip, and skip_cnt can be specified. In the following lmvex instruction, it is assumed that R7 points to the start of matrix 102 (R7 stores 0x12) and that R8 corresponds to rB which stores a cnt value of 9, an rcnt value of 3, stride value of 1, and a skip value of 6. Therefore, the following instruction may be used:

```
lmvex2.u.mh.dh   R0, R7, R8 /*cnt = 9, rcnt = 3, stride = 1, skip = 6 */
```

Therefore, as illustrated in FIG. 16, elements A, B, and C are loaded into R0, each continuous in memory since the stride is "stride*ms" or 1 halfword. At this point, an rcnt number of elements (i.e. 3) has been loaded into R0, and therefore, the next element, D, is loaded from a location "skip*ms" (i.e. 6 halfwords) away. Furthermore, the next element, D, is not loaded as the fourth element of R0, as was done in the previous example of FIG. 15 using the lmvex instruction, but is instead loaded as the first element of R1 (which is the register subsequent to R0) since R0 already has an "rcnt" number of elements. Elements E and F are also loaded into R1, completing an rcnt of 3 for R1. Since an rcnt number of elements has been loaded in R1 (and a cnt number of elements, i.e. 9, has not yet been loaded), the next element, G, is fetched from a location determined by skip, i.e., a location of 6 halfwords away, into R2. Also, elements H and I are also loaded into R2. At this point, a cnt number of elements has been loaded. Also note that each of the unused fields of R0, R1, and R2 are filled with a predetermined value (zero, in this example).

In an alternate embodiment, as described above, the lmvex2 instruction may also allow for a skip_cnt field to be specified. For example, matrix 102 can also be loaded as seen in FIG. 16 using an lmvex2 instruction, as above, with a skip_cnt of 3. In this example (still referring to FIG. 16 and the above lmvex2 instruction with all the same parameters and the addition of skip_cnt=3), elements A, B, and C are loaded into R0, each continuous in memory since the elements are located "stride*ms" or 1 halfword apart. Then, since a skip_cnt number of elements has been loaded (i.e. 3), the next element, D, located at "skip*ms" (i.e. 6 halfwords) away rather than at "stride*ms" (i.e. 1 halfword) away, is loaded. Also, note that only an rcnt number of elements (i.e. 3) is loaded into each register. Therefore, the next element, D, is not loaded as the fourth element of R0, as was done in the previous example of FIG. 15 using the lmvex instruction, but is instead loaded as the first element of R1 (which is the register subsequent to R0). Then elements E and F are also loaded into R1. Since a skip_cnt number of elements has again been loaded (and a cnt number of elements, i.e. 9, has not yet been loaded), the next element, G, is located at 6 halfwords away. Also, since an rcnt number of elements has already been loaded into R1, the next element, G, is loaded into R2, along with H and I. At this point, a cnt number of elements has been loaded. Also note that each of the unused fields of R0, R1, and R2 are filled with a predetermined value (zero, in this example).

Therefore, note that a matrix such as matrix 102 can be easily moved from memory to a register file in a variety of different ways using various embodiments of the load instructions described above. Also note that the use of the rcnt parameter allows for a reduced number of masking operations required when using conventional programming methods to load vector elements from memory.

In alternate embodiments, the above instructions may include more, fewer, or different parameters than those described herein. For example, in different embodiments, the lmvex2 instruction may or may not take into account a skip_cnt parameter. Note also that the example instructions provided above set the s/u field to u such that, if necessary, the elements are zero extended when stored into the registers. In one embodiment, the s/u field may be set to "s" or may be omitted. For example, in one embodiment, if ms=ds, then the s/u field may be omitted or ignored.

FIG. 16 also illustrates an example of a load instruction which loads T, U, and V from locations 0xA2, 0xA3, and 0xA4 in memory portion 100 to R4. For example, the following lvex instruction may be used where it is assumed that R10 stores the start value 0xA2 and R11 stores a cnt value of 3 and a stride value of 1.

```
lvex.u.mb.dh    R4, R10, R11
```

Note that the memory size (mb) and destination size (dh) are different. That is, in all the instructions described herein, each of the memory size and the destination size (or the source size, in the case of store instructions) may be independently set such that they may be the same or different. In the above example, note that the memory size is set to mb indicating that the size of each element (T, U, and V) in memory is a byte. However, the destination size is set to dh to indicate the destination size in R4 is a halfword, which is larger than a byte. Therefore, a cnt number of elements (3 elements) is loaded into R4, where each element T, U, and V is extended appropriately to fill the halfword destination size. In this example, they are zero extended (i.e. unsigned extended) as indicated by the ".u". However, a ".s" could have been used to sign extend each of the elements. Also, note that since "cnt*ds" is 3 halfwords (or 46 bits) and thus less than the size of R4, the remaining unused portion of R4 is filled with a predetermined value (zero, in this example).

FIG. 17 illustrates an example of a register file where vector 104 of memory portion 100 has been loaded with a stride of 1 and with a stride of 2. In one example, assume that R7 points to pp, the start of vector 104, by storing 0x46, and R10 stores a cnt value of 5, a stride value of 1, and a skip_cnt value of 5. Note that the value of skip does not matter in this example because cnt=skip_cnt (i.e. a single vector from memory is being loaded without needing to ever "skip"). The following instruction may therefore be used to load vector 104 into the register file.

```
lmvex.u.mh.dh    R1, R7, R10 /* cnt = 5, stride = 1, skip_cnt = 5 */
```

In the above example, a cnt number of elements (5 elements) is loaded into the register file, starting with R1, then continuing with R2. Since stride=1 and subsequent elements are located a "stride" number of units of size ms apart, the elements to be loaded are located 1 halfword apart from each other. Therefore, 5 contiguous halfwords (pp, qq, rr, ss, and tt) are loaded into registers R1 and R2. Note also that the remaining unused portions of R2 are filled with a predetermined value (zero, in this example). Also, note that a ".s" could have been used for the s/u field instead. Or alternatively, the s/u field may not be present.

In another example, assume that R7 points to pp (stores 0x46), and R10 stores a cnt value of 3 and a stride value of 2. The following instruction may therefore be used to load every other element of vector 104 into the register file.

```
lvex.u.mh.dh    R4, R7, R10 /* cnt = 3, stride = 2 */
```

In this example, an lvex instruction may be used since cnt*ms (3 halfwords) fit into a single register (a 64-bit register in the illustrated embodiment). With this lvex instruction, a cnt number of elements (3 elements) is loaded into R4, where subsequent elements are located a "stride" number of units of size ms apart. Therefore, in this example, subsequent elements are located 2 halfwords ("stride*ms") apart, thus after each element is loaded, the next element is fetched from 2 halfwords away. For example, pp is fetched from 0x46 and then rr is fetched from 0x4A (0x46+0x2). This continues until 3 elements are loaded. Also, note that the unused portion of R4 is filled with a predetermined value (zero, in this example).

Figure 18:
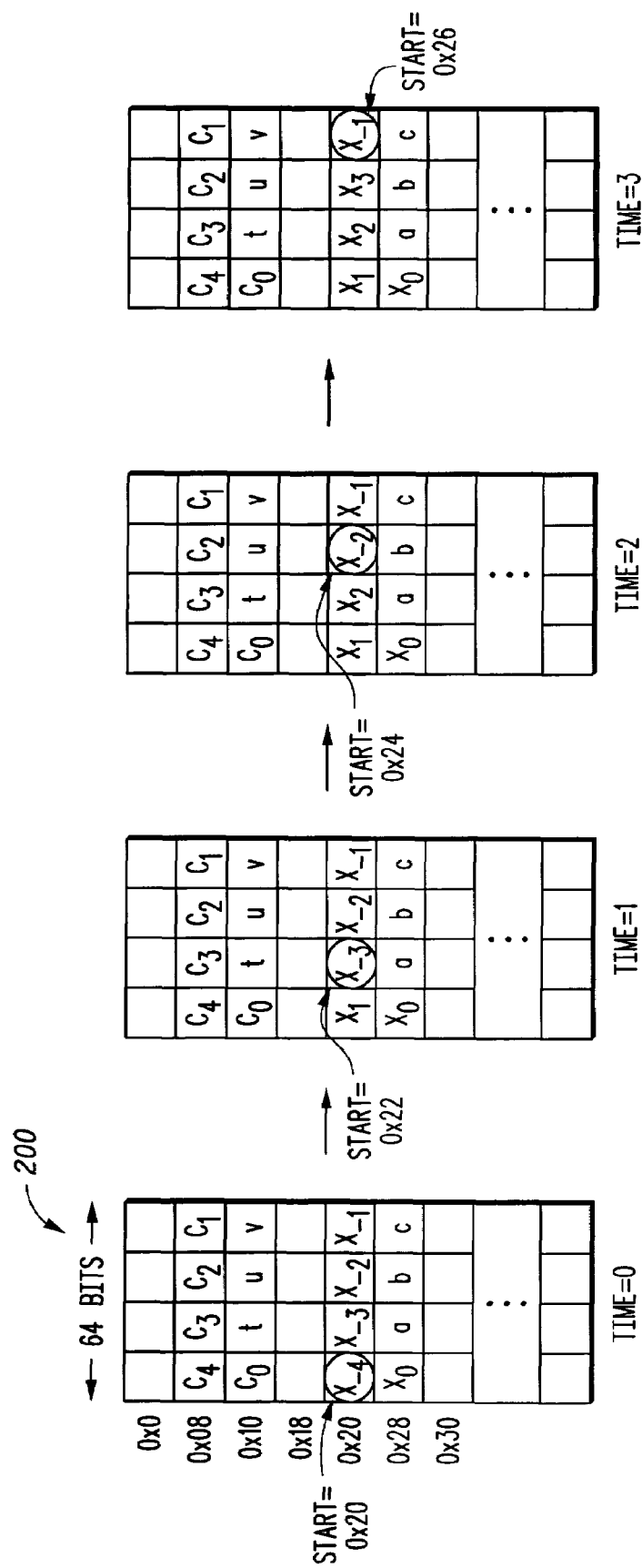
FIG. 18 illustrates an example of a memory portion over time in accordance with one embodiment of the present invention.

FIG. 18 illustrates a portion 200 of a memory at four different times (time=0, time=1, time=2, and time=3) which may correspond, for example, to all or a portion of memory 12 of FIG. 1 (or may be located anywhere within a data processing system). In the illustrated embodiment, memory portion 200 is shown as a 64-bit wide memory. Note that in alternate embodiments, memory portion 200 may be formatted in a variety of different ways having different widths. Memory portion 200 stores elements $C_4$, $C_3$, $C_2$, $C_1$, and $C_0$ at memory locations 0x08, 0x0A, 0x0C, 0x0E, and 0x10, respectively. Elements t, u, and v are stored at 0x12, 0x14, and 0x16, respectively. Memory portion 200 at time=0 also stores $X_{-4}$, $X_{-3}$, $X_{-2}$, $X_{-1}$, and $X_0$ at locations 0x20, 0x22, 0x24, 0x26, and 0x28, respectively. In one embodiment, each of these values may refer to various time samples of a digitally sampled signal sampled at a particular sample rate. For example, at time=0, the current sample is indicated by $X_0$, and the sample of one time delay (i.e. 1/sample rate) before is indicated by $X_{-1}$, the sample of two time delays (i.e. 2*1/sample rate) before is indicated by $X_{-2}$, etc.

Next, at time=1, the current sample is indicated by $X_1$, and the sample of one time delay (i.e. 1/sample rate) before is indicated by $X_0$, the sample of two time delays (i.e. 2*1/sample rate) before is indicated by $X_{-1}$, etc. Note that the newest sample overwrites the most oldest time sample, which was $X_{-4}$ in the illustrated embodiment at time=1. Therefore, at time=2, the current sample, $X_2$ overwrites $X_{-3}$, and at time=3, the current sample, $X_3$ overwrites $X_{-2}$. Therefore, storage locations 0x20, 0x22, 0x24, 0x26, and 0x28 may implement a circular buffer which continuously stores incoming time samples of a digitally sampled signal. In alternate embodiments, a circular buffer may be implemented for different reasons or applications.

In one embodiment, a modified lmvex load instruction may be used to correctly bring in the values of the circular buffer into registers of a register file (as will be described in reference to FIGS. 19-22) in such a way that the values are in a correct desired order for calculations, such as, for example, in implementing a filtering function. For example, the following equations may correspond to a filtering function, where $Y_0$, $Y_1$, $Y_2$, and $Y_3$ correspond to results at time=0, time=1, time=2, and time=3, respectively:

$$Y_0 = C_0*X_0 + C_1*X_{-1} + C_2*X_{-2} + C_3*X_{-3} + C_4*X_{-4} \quad \text{Eq. 1}$$

$$Y_1 = C_0*X_1 + C_1*X_0 + C_2*X_{-1} + C_3*X_{-2} + C_4*X_{-3} \quad \text{Eq. 2}$$

$$Y_2 = C_0*X_2 + C_1*X_1 + C_2*X_0 + C_3*X_{-1} + C_4*X_{-2} \quad \text{Eq. 3}$$

$$Y_3 = C_0*X_3 + C_1*X_2 + C_2*X_1 + C_3*X_0 + C_4*X_{-1} \quad \text{Eq. 4}$$

Figures 27, 28, 29, 30:
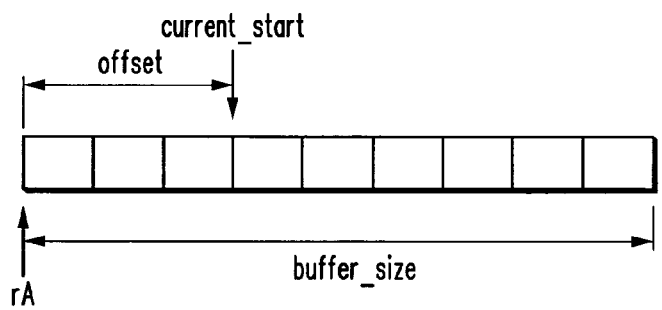

In one embodiment, the modified lmvex instruction is referred to as a skip once load multiple vector elements (lmvex_skip_once) instruction, as illustrated in FIG. 27. The lmvex_skip_once instruction of FIG. 27 includes an s/u field, an ms field, and a ds field, which operate just as described above in reference to the lmvex instruction. The lmvex_skip_once instruction also takes 3 operands: rD, rA, and rB. The lmvex_skip_once uses additional parameters cnt, stride, skip, and skip_cnt, where they are stored in a register or registers indicated by rB, or may be specified by a subopcode of the instruction. All of the operands and additional parameters operate the same as described above in reference to the lmvex instruction, except for the skip_cnt additional parameter. As was described above, the lmvex instruction fetches a skip_cnt number of elements and then uses the "skip" parameter to fetch the next element. At this point, the skip_cnt counter has to be reset such that a next skip_cnt number of elements can be fetched before skipping again. This continues until a cnt number of elements has been loaded. The lmvex_skip_once instruction, unlike the lmvex instruction, does not reset the skip_cnt counter after a skip_cnt number of elements has been fetched. Therefore, after a skip_cnt number of elements is fetched, the next element is located at a skip number of units of size ms away. However, from this point on, the skip_cnt counter is continuously decremented (i.e. not reset) until a "cnt" number of elements has been fetched.

For example, as will be described in reference to FIGS. 19-22, the following section of pseudo code may be used to calculate the filter results $Y_0$, $Y_1$, $Y_2$, and $Y_3$ of Equations 1, 2, 3, and 4 above.

```
/*Initialize R12 to store a cnt value of 5 and a stride value of 1*/
/*Initialize R13 to store a cnt value of 5, stride value of 1,
skip_cnt value of 5, and a skip value of -4*/
    /*Initialize R1 to store 0x08*/
    /*Initialize R2 to store 0x20*/
    lmvex.u.mh.dh    R6, R1, R12  /*loads C4-C1 into R6 and
    C0 into R7*/
    loop:
    lmvex_skip_once.u.mh.dh R8, R2, R13  /*in the first
iteration, loads X-4-X-1 into R8 and X0 into R9*/
        vmac.h R10, R6, R8  /*in the first iteration, stores C4*X-4+
C3*X-3+C2*X-2+C1*X-1 into R10*/
        vmac.h R11, R7, R9  /*in the first iteration, stores C0*X0 into
R11*/
        add    R10, R10, R11  /*in the first iteration, stores Y0 into R10*/
```

-continued

```
/* The value in R10 can be stored to memory */
add    R2, R2, 2  /*moves the start pointer in R2 ahead by 2*/
/* Modify the values in R13 such that "skip_cnt =
skip_cnt - 1" */
branch loop
```

Prior to entering the loop, indicated by the label "loop:" in the above code section, R12 is initialized with a cnt value of 5 and a stride value of 1, and R13 is initialized with a cnt value of 5, stride value of 1, a skip_cnt value of 5, and a skip value of -4. Registers R12 and R13 can therefore be used as the "rB" operand in subsequent vector load instructions. R1 is initialized to point to the start ($C_4$ at 0x08) of the constants vector. R2 is initialized to point to the start of the circular buffer, which, as illustrated in FIG. 18, is 0x20 at time=0. Therefore, note that the first iteration of the loop corresponds to the values loaded into the register file (as illustrated in FIG. 19) corresponding to time=0.

The first lmvex instruction loads $C_4$-$C_1$ into R6 and $C_0$ into R7 (as illustrated with R6 and R7 in FIG. 19) according to the parameters stored in R12, which were previously initialized, and the control fields as described above in reference to FIGS. 4 and 5. The first iteration through the loop then begins with the lmvex_skip_once instruction. In the first iteration, corresponding to time=0, the lmvex_skip_once instruction loads $X_{-4}$-$X_{-1}$ into R8 and $X_0$ into R9 according to the parameters stored in R12 and the control fields, which were previously initialized, as illustrated with R8 and R9 in FIG. 19. Note that since, in this first iteration, skip_cnt=cnt, the skip value can be treated as a "don't care" since the skip value is not needed. That is, when the skip_cnt counter expires, so does the cnt counter, and thus the instruction is completed without "skipping".

The first vector multiply-accumulate instruction (vmac.h) does a vector multiply-accumulate operation on the half-word elements of registers R6 and R8 and stores the result into R10. Therefore, R10 now stores $C_4*X_{-4}+C_3*X_{-3}+C_2*X_{-2}+C_1*X_{-1}$, as illustrated with R10 in FIG. 19. The second vector multiply-accumulate instruction does a vector multiply-accumulate operation on the halfwords of registers R7 and R9, and stores the result into R11. Therefore, R11 now stores $C_0*X_0+0*0+0*0+0*0$ which simply equals $C_0*X_0$. Note that in the current example, with each of the load vector instructions (lmvex and lmvex_skip_once), the remaining unfilled portions of the registers (such as of R7 and of R9) are zeroed, thus resulting in a correct result in R11. Otherwise, R11 may be an incorrect value, if, for example, the values of t, u, and v were loaded from memory 200 instead.

The first add instruction then adds the values of R10 and R11 and stores the result into R10 (this operation is not illustrated in FIG. 19). This value, corresponding to $Y_0$ of equation 1 above can then be stored, such as back to memory 200, as needed. The second add instruction advances the start pointer of the circular buffer to the next halfword such that the start pointer, for time=1, now points to $X_{-3}$ at address 0x22, as illustrated in FIGS. 18 and 20. Next, R13 is modified such that skip_cnt=skip_cnt-1. Therefore, after the first iteration of the above code segment, skip_cnt now equals 4. A loop counter or additional instructions (not included in the above code segment) may be used to indicate whether the loop should be exited. If the loop is not exited, the code branches back to "loop" and the next iteration begins.

The values $C_4$-$C_0$ remain in R6 and R7 (as illustrated with R6 and R7 in FIG. 20). The second iteration through the loop begins with the lmvex_skip_once instruction. In the second iteration, corresponding to time=1, the lmvex_skip_once instruction loads $X_{-3}$-$X_0$ into R8 and $X_1$ into R9 according to the parameters stored in R12 and the control fields, as illustrated with R8 and R9 in FIG. 20. In this iteration, since skip_cnt is 4, and rA points to $X_{-3}$ as the first element to be loaded, 4 elements get loaded: $X_{-3}$-$X_0$. At this point, since a skip_cnt (4) number of elements has been loaded and a cnt (5) number of elements has not yet been loaded, the next element is loaded from a location of "skip" units of size ms (halfword) away. Therefore, a skip of −4 in this example allows for element $X_1$ to be loaded since 0x28−4*2=0x20. (Note that memory 200 is halfword addressable; therefore, skip units of size ms away indicates −4 halfwords away.) Note that as described above, the most recent element in memory 200 at time=1 is stored at 0x20, the location of the previously oldest time sample. Therefore, the lmvex_skip_once instruction correctly loads the 5 elements needed for calculating $Y_1$ from memory locations 0x20-0x28 in the order of oldest to newest time sample into R8 and R9.

The first vector multiply-accumulate instruction (vmac.h) does a vector multiply-accumulate operation on the halfword elements of registers R6 and R8 and stores the result into R10. Therefore, R10 now stores $C_4*X_{-3}+C_3*X_{-2}+C_2*X_{-1}+C_1*X_0$, as illustrated with R10 in FIG. 20. The second vector multiply-accumulate instruction does a vector multiply-accumulate operation on the halfwords of registers R7 and R9, and stores the result into R11. Therefore, R11 now stores $C_0*X_1+0*0+0*0+0*0$ which simply equals $C_0*X_1$. Note that in the current example, with each of the load vector instructions (lmvex and lmvex_skip_once), the remaining unfilled portions of the registers (such as of R7 and of R9) are zeroed, thus resulting in a correct result in R11. Otherwise, R11 may be an incorrect value, if, for example, the values of a, b, or c (or t, u, or v) were loaded from memory 200 instead.

The first add instruction then adds the values of R10 and R11 and stores the result into R10 (this operation is not illustrated in FIG. 20). This value, corresponding to $Y_1$ of equation 2 above can then be stored, such as back to memory 200, as needed. The second add instruction advances the start pointer of the circular buffer to the next halfword such that the start pointer, for time=2, now points to $X_{-2}$ at address 0x24, as illustrated in FIGS. 18 and 21. Next, R13 is modified such that skip_cnt=skip_cnt−1. Therefore, after the second iteration of the above code segment, skip_cnt now equals 3. A loop counter or additional instructions (not included in the above code segment) may be used to indicate whether the loop should be exited. If the loop is not exited, the code branches back to "loop" and the next iteration begins.

The third iteration operates similar to the first and second iterations. For the third iteration, corresponding to time=2, the lmvex_skip_once instruction loads $X_{-2}$, $X_{-1}$, $X_0$, $X_1$, and $X_2$ into registers R8 and R9, as illustrated in FIG. 21. Therefore, once elements $X_{-2}$, $X_{-1}$, and $X_0$ are loaded (starting at 0x24), a skip_cnt number of elements has been loaded and skip is used to load $X_1$ and $X_2$. The subsequent vector multiply-accumulate instructions result in $C_4*X_{-2}+C_3*X_{-1}+C_2*X_0+C_1*X_{-1}$ being stored in R10 and $C_0*X_2$ in R11. The first add instruction stores the result corresponding to $Y_2$ into RIO, where $Y_2$ can then be stored to memory, if desired. The second add instruction then advances the pointer to start location 0x26, as illustrated in FIG. 22. Also, R13 is modified such that skip_cnt=skip_cnt−1. Therefore, after the third iteration of the above code segment, skip_cnt now equals 2. A loop counter or additional instructions (not included in the above code segment) may be used to indicate whether the loop should be exited. If the loop is not exited, the code branches back to "loop" and the next iteration begins.

With the lmvex instruction described above in reference to FIGS. 4 and 5, the mechanism (e.g. a counter) keeping track of skip_cnt is reset such that when a next skip_cnt number of elements is loaded (and assuming a cnt number of elements has not yet been loaded) the next element is loaded from skip*ms units away. However, in the current example, a lmvex_skip_once instruction is being used such that when a skip_cnt number of elements is loaded, the mechanism keeping track of skip_cnt is not reset. In this manner, skip will not be used again before loading a full cnt number of elements. This allows for all the elements to be correctly loaded in subsequent iterations, as will be described, for example, with the fourth iteration (corresponding to time=3.) The fourth iteration operates similar to the previous iterations. For the fourth iteration, corresponding to time=3, the lmvex_skip_once instruction loads $X_{-1}$, $X_0$, $X_1$, $X_2$, and $X_3$ into registers R8 and R9, as illustrated in FIG. 22. In this iteration, note that the first element loaded is $X_{-1}$ from location 0x26 (as illustrated in FIG. 18 for time=3). After loading $X_{-1}$ and $X_0$, a skip_cnt (which now equals 2) number of elements has been loaded; therefore, skip is used to wrap the pointer back to location 0x20 since a cnt (5) number of elements has not yet been loaded. Note also that the skip_cnt mechanism is not reset. In this manner, even after a next skip_cnt (2) number of elements is loaded, no skip is performed. If a skip were performed for this iteration after a next skip_cnt number of elements, then only elements $X_1$ and $X_2$ would be fetched before skipping, thus missing element $X_3$. Therefore, although it may not have mattered in earlier iterations whether skip_cnt was reset after the first skip, in some iterations, such as this one, it may determine whether or not the correct elements are fetched. Therefore, it can be appreciated how the lmvex_skip_once instruction may be used to correctly implement a circular buffer, such as, for example, for a filter application. Note also that the above code segment could have been written in a variety of different ways. For example, the loop may have been rolled out rather than written as a loop. In this example, the lmvex instruction may have been used for times=0, 1, and 2, and the lmvex_skip_once instruction may have been used only for times=3 and 4.

As seen in FIG. 22, once elements $X_{-1}$, $X_0$, $X_1$, $X_2$, and $X_3$ are loaded, the subsequent vector multiply-accumulate instructions result in $C_4*X_{-1}+C_3*X_0+C_2*X_{-1}+C_1*X_{-2}$ being stored in R10 and $C_0*X_3$ in R11. The first add instruction stores the result corresponding to $Y_3$ into R10, where $Y_3$ can then be stored to memory, if desired. At this point, flow continues as was described above with the previous iterations. In one embodiment, after R12 is modified to the point that skip_cnt is 0, the loop may be exited such that skip_cnt can be reset, for example, back to 5 and the entire process repeated.

Therefore, it can be appreciated how the vector load instructions, along with skip, skip_cnt, stride and cnt, can be used to implement a circular buffer. In one embodiment, a circular buffer load multiple vector elements (lmvex_cb) instruction may be used, as illustrated in FIG. 28. This instruction is similar to the lmvex instruction described above in reference to FIGS. 4 and 5, except that the additional parameters stored in rB are buffer_size and offset. (As with the lmvex instruction, note that in an alternate embodiment, the additional parameters may be included as part of the opcode or subopcode.) FIG. 29 illustrates how the additional parameters may be used to define a circular buffer. For example, rA, as with the load instructions described above, indicates the start of the memory location which stores the circular buffer in memory, as illustrated in FIG. 29. The buffer_size indicates the "total number of buffer elements*ms", and the offset defines where in the circular buffer is the first element to be loaded. Also, note that although not illustrated, a circular buffer store multiple vector elements (stmvex_cb) instruction may also be used, as the store counterpart of lmvex_cb. For both the lmvex_cb and stmvex_cb instructions, in some embodiments, the current start value represented by "offset" is automatically incremented or decremented by a predetermined number of elements after each pass through the circular buffer, i.e. after a cnt number of elements has been processed, as part of the execution of the lmvex_cb or stmvex_cb instructions.

FIG. 30 illustrates a circular buffer load stream of elements (lstrmvex_cb) instruction which operates similar to the lstrmvex instruction above, except that the additional parameters include buffer_size and offset (as was described above in reference to FIG. 29) rather than cnt, skip, and skip_cnt. Just as the lstrmvex instruction above, the lstrmvex_cb instruction initiates a stream of vector elements from memory, where the elements may be dequeued depending on, for example, when rD is used as particular source operand of a subsequent instruction. Therefore, except with respect to the addressing modes, the same discussions above for lstrmvex apply here for lstrmvex_cb. Also, note that although not illustrated, a circular buffer store vector stream of elements (ststrmvex_cb) instruction may also be used, as the store counter part of lstrmvex_cb. For both the lstrmvex_cb and ststrmvex_cb instructions, in some embodiments the current start value represented by "offset" is automatically incremented by a predetermined number of elements after each pass through the circular buffer.

Optional specifiers for the lmvex_cb, stmvex_cb, lstrmvex_cb, and ststrmvex_cb instructions include rcnt and stride (not shown in FIGS. 29 and 30), operating as described in reference to the lmvex, lmvex2, stmvex, stmvex2, lstrmvex, and ststrmvex instructions earlier. This allows for control over the number of circular buffer elements loaded into each instance of register rD, or stored from each instance of source register rS, as well as controlling the striding of accesses through the circular buffer. Striding may be used, for example, to implement fractional rate filtering operations, or decimating filters.

FIGS. 23-26 illustrates one example of how the lstrmvex instruction (described above in reference to FIG. 7) may be used to perform, for example, matrix multiplication. For this example, memory portion 100 of FIG. 12 and matrices 102, 106, and 108 will be used. FIGS. 23-26 illustrate the contents of a register file, such as, for example, scalar register file 34 of FIG. 1, at various points in time during the matrix multiplication.

In the current example, matrix 102 will be multiplied by matrix 106 and the result will correspond to matrix 108. For example, in performing the matrix multiplication, the following equations are used for the first two columns of the resulting matrix 108.

$$aa=A*K+B*N+C*Q \qquad \text{Eq. 5}$$

$$dd=D*K+E*N+F*Q \qquad \text{Eq. 6}$$

$$gg=G*K+H*N+I*Q \qquad \text{Eq. 7}$$

$$bb=A*L+B*O+C*R \qquad \text{Eq. 8}$$

$$ee=D*L+E*O+F*R \qquad \text{Eq. 9}$$

$$hh=G*L+H*O+I*R \qquad \text{Eq. 10}$$

In the above equations, note that in obtaining aa, dd, and gg, it is desirable to dequeue elements from matrix 102 (since A, B, C is used to obtain aa; D, E, F is used to obtain dd; and G, H, I is then used to obtain gg) while it is not desirable to dequeue matrix 106 (since K, N, Q is needed to obtain each of aa, dd, and gg). Therefore, the following pseudo-code provides an example of how instructions, such as lstrmvex instructions, may be used to obtain the result matrix 108. Note that in the following pseudo-code example, dequeueing is only performed when rD appears as the first source (source1) of an instruction (e.g. instruction destination, source1, source2).

```
/*Initialize R6 to store a cnt of 9, rcnt of 3, stride of 1, skip of 6,
and skip_cnt of 3*/
    /*Initialize R4 to store 0x12, i.e. start of first row of matrix 102 */
    /* Initialize R7 to store a cnt of 9, rcnt of 3, stride of 8, skip
of -15, and skip_cnt of 3*/
    /*Initialize R5 to store 0x54, i.e. start of first column of
matrix 106 */
    lstrmvex.u.mh.dh R1, R4, R6 /*loads first row of matrix
102: A,B,C */
    lstrmvex.u.mh.dh R2, R5, R7 /*loads first colunm of matrix 106:
K,N,Q*/
    vmac.h R10, R1, R2 /*stores aa in R10 and dequeues R1
of matrix 102*/
    vmac.h R11, R1, R2 /*stores dd in R11 and dequeues R1
of matrix 102*/
    vmac.h R12, R2, R1 /*stores gg in R12 and dequeues R2
of matrix 104*/
    lstrmvex.u.mh.dh R1, R4, R6 /*loads first row of matrix 102:
A,B,C*/
    vmac.h R13, R1, R2 /*stores bb in R13 and dequeues R1
of matrix 102*/
    vmac.h R14, R1, R2 /*stores ee in R14 and dequeues R1
of matrix 102*/
    vmac.h R15, R2, R1 /*stores hh in R15 and dequeues R2
of matrix 104*/
```

The above pseudo-code can be used to obtain aa, dd, gg, bb, ee, and hh, as described in equations 5-8 above. As used in this example, all values are assumed to be unsigned halfwords. First, R6 is initialized to store a cnt of 9, an rcnt of 3, a stride of 1, a skip of 6, and a skip_cnt of 3, where R6 can be used as the rB register for an lstrmvex instruction. R4, as illustrated in FIG. 23, is initialized to point to element A at 0x12, i.e. the first element of the first row of matrix 102 of FIG. 12. R7 is initialized to store a cnt of 9, an rcnt of 3, a stride of 8, a skip of -15, and a skip_cnt of 3, where R7 can be used as the rB register for an lstrmvex instruction. R5, as illustrated in FIG. 23, is initialized to point to element K at 0x54, i.e. the first element of the first column of matrix 106.

The first lstrmvex instruction initiates a stream of vector elements which loads each row of matrix 102 in turn. First, the instruction loads the first row of matrix 102 into R1 (as illustrated in FIG. 23). For example, elements A, B, and C are each one halfword apart (therefore a stride of 1 is needed). An rcnt of 3 loads only 3 elements at a time into R1 (with the remaining portion zeroed out), and after a skip_cnt number of elements (3, in this example) is loaded, then a skip of 8*ms (8 halfwords) is added to the location of C (0x16) to obtain the address of the next element, D, at location 0x22 (0x16+0x08). When R1 is used as source1 of a subsequent instruction, as will be described below, then it is dequeued such that the next row of matrix 102 (as defined by rcnt, stride, and skip_cnt) is loaded into R1.

The second lstrmvex instruction initiates a stream of vector elements which loads each column of matrix 106 into R2 in turn. First, the instruction loads the first column of matrix 106 into R2 (as illustrated in FIG. 23). For example, elements K, N, and Q are each 8 halfwords apart in memory (therefore a stride of 8 is needed). An rcnt of 3 loads only 3 elements at a time into R2 (with the remaining portion zeroed out), and after a skip_cnt number of elements (3, in this example) is loaded, then a skip of −15*ms (−15 or −0x0F halfwords) is added to the location of Q (0x74) to obtain the address of the next element, L, at location 0x56 (0x74−0x0F*2), where L is the first element of the second column of matrix 106. When R2 is used as source1 of a subsequent instruction, as will be described below, then it is dequeued such that the next column of matrix 106 (defined by rcnt, stride, and skip_cnt) is loaded into R2.

The first multiply accumulate (vmac) instruction stores A*K+B*N+C*Q (which equals aa) into R10, as illustrated in FIG. 24. Since R1 is used as source1, it is dequeued according to the first lstrmvex instruction (and the parameters in R6) such that the next row of matrix 102 (D, E, and F) is stored into R1 with the remaining portion zeroed out. At this point, note that since R2 is not used as source1, it is not dequeued; therefore, K, N, and Q remain in R2 and the next column of matrix 106 is not yet stored into R2.

The second multiply accumulate (vmac) instruction stores D*K+E*N+F*Q (which equals dd) into R11, as illustrated in FIG. 25. Since R1 is used as source1, it is again dequeued according to the first lstrmvex instruction (and the parameters in R6) such that the next row of matrix 102 (G, H, and I) is stored into R1 with the remaining portion zeroed out. At this point, 9 elements corresponding to the first lstrmvex instruction have been loaded, thus, a "cnt" number of elements has been loaded and the streaming for this instruction ends. Since R2 is not used as source1, it is not dequeued; therefore, K, N, and Q remain in R2 and the next column of matrix 106 is not yet stored into R2. At this point, only 3 elements corresponding to the second lstrmvex instruction have been loaded, thus a cnt number of elements has not been loaded for this instruction.

The third accumulate (vmac) instruction stores G*K+H*N+I*Q (which equals gg) into R11, as illustrated in FIG. 26. Since R2 is now used as source1, it is subsequently dequeued according to the second lstrmvex instruction (and the parameters in R7) such that the next column of matrix 106 (L, O, and R) is stored into R2 with the remaining portion zeroed out. At this point, 6 of the 9 elements of matrix 106 have been loaded. Also, since a "cnt" number of elements (for matrix 102) has already been loaded by the first lstrmvex instruction, R1 does not change and still holds G, H, and I. (Furthermore, even if a "cnt" number of elements had not yet been loaded by the first lstrmvex instruction, R1 still would not change because since R1 is used as source2 it would not dequeued.)

The third lstrmvex instruction initiates a new stream of vector elements that is the same as the first lstrmvex instructions. That is, the third lstrmvex instruction loads each row of matrix 102 into R1 in turn, as was described above. The subsequent three vmac instructions store the values of bb, ee, and hh into R13, 14, and 15, respectively. Note that, as with the first three vmac instructions, the first lstrmvex instruction is dequeued with the first two vmac instructions following the third lstrmvex instruction and the second lstrmvex instruction is dequeued with the third vmac instruction following the third lstrmvex instruction. At this point, the final column of matrix 106 (M, P, and S) would be loaded into R2 (not shown) and loading for the second lstrmvex instruction would stop because a "cnt" number of elements (e.g. 9 elements) would have been loaded at this point. Similar instructions can then be used to obtain cc, ff, and ii. The values of aa, dd, gg, bb, ee, hh, cc, ff, and ii can then be stored back to memory locations 0x8A, 0x9A, 0xAA, 0x8C, 0x9C, 0xAC, 0x8E, 0x9E, and 0xAE, respectively, of matrix 108. Vector store instructions, as described herein, can be used to perform these stores.

Note that in the above pseudo code example, the elements are dequeued depending on the location of rD in the subsequent instruction (i.e. whether rD is used as source1 or source2). However, note that in alternate embodiments, other factors may be used to indicate whether the elements should be dequeued or not. For example, a different opcode may be used to indicate dequeueing, or other indicators, such as, for example, a flag may be used. Also, in one embodiment, rD is dequeued anytime it appears as a source in a subsequent instruction, not just when it is source1. In yet another embodiment, dequeueing is performed only when the instruction using the same register rD as a source operand is one or more predetermined instructions in a proper subset of all instructions implemented by processing unit 14. That is, in this embodiment, only a subset of instructions or instruction functions actually perform dequeueing as part of their execution, and the remaining instructions implemented by processing unit 14 do not perform dequeueing, regardless of the use of rD as a source operand. The subset which performs dequeueing may be a predetermined subset of the total instructions implemented, and may be determined based on the needs of data processing system 10. In yet another embodiment, dequeueing may be determined by a control field value within the instruction for controlling the dequeueing operation.

Although dequeueing has been described in the preceding paragraphs describing FIGS. 23-26, the analogous operation of enqueueing is equally applicable to embodiments of the current invention, and operate in a substantially similar manner. Enqueueing may be performed based on the location of an enqueueing source register rS as a destination of a subsequent instruction, or based on being a destination operand in one or more predetermined instructions in a proper subset of all instructions implemented by processing unit 14. That is, in one embodiment, only a subset of instructions or instruction functions actually perform enqueueing as part of their execution, and the remaining instructions implemented by processing unit 14 do not perform enqueueing, regardless of the use of rS as a destination operand. The subset which performs enqueueing may be a predetermined subset of the total instructions implemented, and may be determined based on the needs of data processing system 10. In yet another embodiment, enqueueing may be determined by a control field value within the instruction for controlling the enqueueing operation.

FIG. 31 illustrates an instruction that may be used with Fast Fourier Transforms (FFTs). FIG. 31 illustrates a load multiple vector elements FFT (lmvex_fft) instruction which has control fields s/u, ms, and ds and operands rD, rA, and rB. Each of these control fields and operands operates as described above in reference to the other load instructions. The lmvex_fft instruction also uses an additional parameter "radix" stored in rB, and may optionally implement an rcnt control field stored in rB as described above in reference to other load vector element instructions. As with the above instructions, in an alternate embodiment, "radix" (and "rcnt", if present) can be part of the opcode or subopcode, and therefore, rB may not be necessary. The lmvex_fft instruction may also use a truncation or rounding field, as described above.

FIG. 32 illustrates a store multiple vector elements FFT (stmvex_fft) instruction which also has control fields s/u, ms, and ss and operands rS, rA, and rB. Each of these control fields and operands operates as described above in reference to the other store instructions. The stmvex_fft instruction may also use a truncation or rounding field, as described above, and may optionally implement an rcnt control field as described above in reference to other store vector element instructions. The stmvex_fft instruction also uses an additional parameter "radix" stored in rB. As with the above instructions, in an alternate embodiment, "radix" can be part of the opcode or subopcode, and therefore, rB may not be necessary. The stmvex_fft instruction may be considered the store counterpart of the lmvex_fft instruction.

Referring back to the lmvex_fft instruction, the "radix" parameter may be used to load a series of data into a register or set of registers according to an FFT addressing algorithm, as known in the art. For example, for FFT, it is known that data in the order of $X_0, X_1, X_2, X_3, X_4, X_5, X_6$, and $X_7$ is "bit reversed" into the order of $X_0, X_4, X_6, X_2, X_1, X_5, X_3, X_7$ for certain FFT calculations. In the lmvex_fft instruction, the "radix" defines the number of elements, and the particular storage sequence of the elements. For example, FIG. 34 illustrates a memory portion 300 which may be, for example a portion of memory 12 of FIG. 1. Memory portion 300 includes elements $X_0, X_1, X_2, X_3, X_4, X_5, X_6$, and $X_7$ stored at locations 0x16-0x24, respectively. Memory portion 300 also includes elements $Y_0, Y_4, Y_6, Y_2, Y_1, Y_5, Y_3$, and $Y_7$ stored at locations 0x44-0x52.

FIG. 35 illustrates a portion of a register file such as scalar register file 34 of FIG. 1. For example, an lmvex_fft instruction with a radix of 8 can be used to bring in the X elements in a bit reversed fashion into registers R1 and R2 (as illustrated in FIG. 35), where R1 is specified by rD and the first memory location to be loaded (0x16) is specified by rA. Similarly, an lmvex_fft with a radix of 8 can be used to bring in the bit reversed Y elements in a sequential order into register R4 and R5 (as illustrated in FIG. 35), where R4 is specified by rD and the first memory location to be loaded (0x44) is specified by rA. Therefore, the lmvex_fft instruction may load elements in a bit reversed fashion, where the elements are either initially bit reversed or not.

Similarly, the stmvex_fft instruction can be used to store the elements in a bit reversed fashion to memory. For example, the stmvex_fft instruction, with a radix of 8, can be used to store the bit reversed X elements from R1 and R2 into memory at locations 0x16-0x24, such that the elements in memory are not bit reversed as compared to those in R1 and R2. Similarly, the stmvex_fft instruction can be used to store the sequential Y elements from R4 and R5 into memory at locations 0x44-0x52, such that the elements in memory are bit reversed compared to those in R4 and R5.

FIG. 33 illustrates a load stream of vector elements FET (lmstrmvex_fft) instruction which has control fields s/u, ms, and ds and operands rD, rA, and rB. Each of these control fields and operands operates as described above in reference to the lmstrmvex instruction. The lmstrmvex_fft instruction also uses an additional parameter "radix" stored in rB, and may optionally implement an rcnt control field stored in rB as described above in reference to other load vector element instructions. As with the above instructions, in an alternate embodiment, "radix" (and "rcnt", if present) can be part of the opcode or subopcode, and therefore, rB may not be necessary. The "radix" defines the total number of elements to be loaded. As with the lmstrmvex instruction, the lmstrmvex_fft initiates a stream of vector elements from memory, where the elements are loaded in a bit reversed fashion or in a sequential order from a bit reversed order and may be dequeued depending on, for example, the location of rD in a subsequent instruction. Note that, although not illustrated, a counterpart store instruction may be used to initiate storing of a stream of elements to memory in a bit reversed fashion, such as for FFT applications.

Therefore, it can be appreciated how a variety of different types of vector load and store instructions can be used in a system having a set of registers, such as, for example, a scalar register file. That is, the above instructions can be used with existing designs or may only require minor modifications to the execution units (such as execution units 32) and control units (such as control unit 28) of existing designs. Note that each of the instructions described herein can have different formats, and may even be divided into multiple instructions. Also, in transferring vector elements to and from registers, an additional parameter may be used to indicate which register elements to transfer to memory (such as for vector store instructions) or into which register elements within a register to store the vector elements loaded from memory (such as for vector load instructions). Furthermore, an additional parameter may be used to define how to place vector elements into registers or where to read vector elements from memory. For example, a starting location indicator may be provided with indicates where in a register to start transferring to or from. Also, a stride may be given for a register such that parameters may be transferred to or from the register in a non-contiguous manner within the register. Also, all the parameters and control fields described herein may appear in any combination with any of the instructions.

Also, note that different addressing modes have been discussed above, such as one using stride, skip, skip_cnt, etc., or one using buffer_size and offset, or one using a radix. However, in alternate embodiments, different addressing modes may be used. For example, array dimensions may be specified instead, such as, for example, the dimensions of the array (e.g. a 2-dimensional 4×4 array, a 3-dimensional 5×5 array, etc.). Therefore, the addressing modes described herein with the above embodiments may be used to load or store data or arrays of data in various patterns, including, for example, zig-zag patterns and other regular patterns, as described above. The instructions described herein may also reduce the overhead required to transfer memory elements to and from memory as compared to the overhead required in current SIMD processors. For example, in current processors capable of SIMD operations, a large number of instructions is necessary for transferring vector elements (such as vectors or arrays of data or other regular patters of data) to and from memory. However, the same transfer of elements can be accomplished with the vector load and store instructions described above where a reduced number of instructions (or just one instruction) may be used to accomplish the transfer.

The following paragraphs provide descriptions of various aspects, forms, and embodiments of the present invention. Each of the descriptions provides only examples of various embodiments, and is not intended to limit any of the descriptions or embodiments discussed above.

According to one aspect of the present invention, a data processing system has a memory for storing operands and at least one general purpose register. Processor circuitry executes one or more instructions, and at least one of the one or more instructions transfers data elements between the memory and the at least one general purpose register. The at least one or more instructions specifies size of data elements in the memory separate and independent from specifying size of data elements in the at least one general purpose register. In one form, the one or more instructions includes independent fields for separately storing a first data size specifier for the memory and a second data size specifier for the at least one general purpose register. In another form, the one or more instructions specifies a storage location for defining a first data size specifier for the memory and a second data size specifier for the at least one general purpose register. In one form the storage location is any one of a location in the memory and a processor register location external to the memory. In another form the storage location is a control register of the data processing system. In one form the storage location is a register within the data processing system that arithmetic, logical and shift operations performed by the data processing system utilize. The memory may further include a plurality of multiple data elements to be transferred between the memory and the at least one general purpose register. In one form the multiple data elements are contiguous in the memory. In another form the multiple data elements are non-contiguous in the memory. In one form each of the at least one general purpose register holds multiple data elements. In another form each of the at least one general purpose register includes a scalar register that has a one-dimensional memory map.

When the at least one or more instructions specifies size of a source data element in the memory to be greater than size of a destination data element in the at least one general purpose register, the processor circuitry may truncate a portion of the source data element in the memory. The portion of the source data element in the memory that is truncated may be a high order portion of the source data element in the memory. The portion of the source data element in the memory that is truncated may be a low order portion of the source data element in the memory. When the at least one or more instructions specifies size of a source data element in the memory to be greater than the size of a destination data element in the at least one general purpose register, the processor circuitry may round a high order portion of the source data element in the memory based on a value of a low order portion of the source data element in the memory. When the at least one or more instructions specifies size of a source data element in the memory to have a smaller size than a destination data element in the at least one general purpose register, the processor circuitry may place predetermined data values in a portion of the destination data element of the at least one general purpose register that is not filled by the source data element from the memory. In one form the processor circuitry places predetermined data values in the portion of the destination data element of the at least one general purpose register by using zero extension. In another form the processor circuitry places predetermined data values in the portion of the destination data element of the at least one general purpose register by using sign extension. In yet another form the processor circuitry places predetermined data values in the portion of the destination data element of the at least one general purpose register by filling a predetermined bit value in a low order data portion of the destination data element of the at least one general purpose register and the predetermined bit value is a zero value.

When the at least one or more instructions specifies size of a destination data element in the memory to be less than a size of a source data element in the at least one general purpose register, the processor circuitry may truncate a portion of the source data element in the at least one general purpose register. In one form the processor circuitry truncates a high order portion of the source data element in the at least one general purpose register. In another form the processor circuitry truncates a low order portion of the source data element in the at least one general purpose register. When the at least one or more instructions specifies size of a destination data element in the memory to be less than a size of a source data element in the at least one general purpose register, the processor circuitry may round a high order portion of the source data element in the at least one general purpose register based on a value of a low order portion of the source data element. When the at least one or more instructions specifies size of a destination data element in the memory to be greater than a size of a source data element in the at least one general purpose register, the processor circuitry may place predetermined data values in a portion of the destination data element in the memory that is not filled by the source data element in the at least one general purpose register. In another form the processor circuitry places the predetermined data values in the portion of the destination data element in the memory that is not filled by using zero extension or by placing the predetermined data values in the portion of the destination data element in the memory that is not filled by using sign extension. In another form predetermined data values are placed in the portion of the destination data element in the memory that is not filled by placing a predetermined bit value in a low order data portion of the destination data element.

According to another aspect, a method for loading and storing data elements in a data processing system includes providing a memory for storing operands and providing at least one general purpose register. One or more instructions are executed, at least one of the one or more instructions causing a transfer of data elements between the memory and the at least one general purpose register. The at least one or more instructions specifies size of data elements in the memory separate and independent from specifying size of data elements in the at least one general purpose register. Size of data elements are specified by implementing independent fields within the at least one or more instructions, a first field indicating a first data size specifier for the memory and a second field indicating a second data size specifier for the at least one general purpose register. Size of data elements may be specified by implementing a predetermined field within the at least one or more instructions, the predetermined field indicating a storage location for defining a first data size specifier for the memory and a second data size specifier for the at least one general purpose register. A portion of a source data element in the memory may be truncated when the at least one or more instructions specifies size of the source data element in the memory to be greater than size of a destination data element in the at least one general purpose register. In another form, a high order portion of a source data element in the memory is rounded based on a value of a low order portion of the source data element in the memory when the at least one or more instructions specifies size of the source data element in the memory to be greater than a size of a destination data element in the at least one general purpose register. In another form, a data processing system includes a memory and a processor for executing data processing instructions. At least one of the data processing instructions includes control information that specifies size of data elements stored in the memory separate and independent from specifying size of data elements stored in at least one storage location in the data processing system external to the memory.

In another form, the processor circuitry in the system executes at least a first instruction and a second instruction subsequent to the first instruction. The first instruction transfers a stream of data elements between the memory and the at least one general purpose register to be queued in at least one of the memory and the at least one general purpose register. The second instruction includes at least a first source operand, and conditionally dequeues a portion of the stream of data elements based on the at least one general purpose register appearing as a source operand of the second instruction. Conditional dequeueing of the portion of the stream of data elements may be performed when the at least one general purpose register is used as a source operand for a predetermined type of function specified by the second instruction. In another form, conditionally dequeueing of the portion of the stream of data elements is performed based on a value of a control field of the second instruction. The second instruction may further include a second source operand, and the conditional dequeueing may be performed when the at least one general purpose register appears as the first source operand. In one form, the conditional dequeueing is not performed when the at least one general purpose register appears as the second source operand.

According to another aspect, a method of selectively dequeueing data elements in data processing system includes providing a memory for storing operands and providing at least one general purpose register. At least a first instruction and a second instruction subsequent to the first instruction are executed. A stream of data elements are transferred between the memory and the at least one general purpose register in response to the first instruction. The stream of data elements in at least one of the memory and the at least one general purpose register are queued. A second instruction subsequent to the first instruction is executed. The second instruction includes at least a first source operand. A portion of the stream of data elements is conditionally dequeued based on the at least one general purpose register appearing as the source operand of the second instruction. The portion of the stream of data elements is conditionally dequeued when the at least one general purpose register is used as a source operand for a predetermined type of function specified by the second instruction. A second source operand may be provided within the second instruction and the portion of the stream of data elements may be conditionally dequeued when the at least one general purpose register appears as the first source operand. In one form, dequeueing is not performed when the at least one general purpose register appears as the second source operand.

According to another aspect, a data processing system includes a memory for storing operands and at least one general purpose register. Processor circuitry executes a plurality of instructions, a first one of the plurality of instructions transferring a stream of data elements between the memory and the at least one general purpose register and to be queued in at least one of the memory and the at least one general purpose register. A portion of the stream of data elements is conditionally dequeued in response to a second one of the plurality of instructions corresponding to a predetermined instruction within a proper subset of the plurality of instructions. The processor circuitry may further conditionally dequeue the portion of the stream of data elements based on the at least one general purpose register appearing as a source operand of the second one of the plurality of instructions. The processor circuitry may further conditionally dequeue the portion of the stream of data elements based on the value of a control field of the second one of the plurality of instructions.

According to another aspect, a method of selectively dequeueing data elements in a data processing system includes providing a memory for storing operands and providing at least one general purpose register. A plurality of instructions is executed, a first one of the plurality of instructions transferring a stream of data elements between the memory and the at least one general purpose register. The stream of data elements is queued in at least one of the memory and the at least one general purpose register. A portion of the stream of data elements is conditionally dequeued in response to a second one of the plurality of instructions corresponding to a predetermined instruction within a proper subset of the plurality of instructions.

According to another aspect, a data processing system includes a memory for storing operands and at least one general purpose register. Processor circuitry executes a plurality of instructions. A first one of the plurality of instructions transfers a stream of data elements between the memory and the at least one general purpose register to be queued in at least one of the memory and the at least one general purpose register. A portion of the stream of data elements is conditionally enqueued based on the at least one general purpose register appearing as a destination operand of a second one of the plurality of instructions.

According to another aspect, a method of selectively enqueueing data elements in a data processing system includes providing a memory for storing operands and providing at least one general purpose register. A plurality of instructions is executed, a first one of the plurality of instructions transferring a stream of data elements between the memory and the at least one general purpose register and to be queued in at least one of the memory and the at least one general purpose register. A portion of the stream of data elements is conditionally enqueued based on the at least one general purpose register appearing as a destination operand of a second one of the plurality of instructions.

According to another aspect, a data processing system includes a memory for storing operands and at least one general purpose register. Processor circuitry executes at least a first instruction and a second instruction subsequent to the first instruction. The first instruction transfers a stream of data elements between the memory and the at least one general purpose register to be queued in at least one of the memory and the at least one general purpose register. The second instruction includes at least a first destination operand. A portion of the stream of data elements is conditionally enqueued based on at least one general purpose register appearing as a destination operand of the second instruction.

According to another aspect, a data processing system includes a memory for storing operands and at least one general purpose register. Processor circuitry executes at least a first instruction and a second instruction subsequent to the first instruction. The first instruction transfers a stream of data elements between the memory and the at least one general purpose register to be queued in at least one of the memory and the at least one general purpose register. The first instruction further specifies a number of data elements to be transferred, and conditionally dequeues a plurality of data elements from the portion of the stream of data elements based on the at least one general purpose register appearing as a source operand of the second instruction.

According to another aspect, a data processing system includes a memory for storing operands and at least one general purpose register. Processor circuitry executes at least a first instruction and a second instruction subsequent to the first instruction. The first instruction transfers a stream of data elements between the memory and the at least one general purpose register to be queued in at least one of the memory and the at least one general purpose register. The first instruction further specifies the number of data elements to be transferred, and conditionally enqueues a plurality of data elements from the portion of the stream of data elements based on the at least one general purpose register appearing as a destination operand of the second instruction.

According to another aspect, a data processing system includes a memory for storing operands, at least one general purpose register, and processor circuitry. The processor circuitry executes a plurality of instructions. A first one of the plurality of instructions transfers a stream of data elements between the memory and the at least one general purpose register to be queued in at least one of the memory and the at least one general purpose register. At least one of enqueueing and dequeueing of a portion of the stream of data elements is conditionally performed in response to a control field within a second one of the plurality of instructions.

According to another aspect, a data processing system includes a memory for storing operands and a plurality of general purpose registers wherein each general purpose register holds multiple data elements. Processor circuitry executes one or more instructions, at least one of the one or more instructions transfers a plurality of data elements between the memory and the at least two of the plurality of general purpose registers wherein the at least one or more instructions specifies a number of register elements to be transferred between each of the at least two of the plurality of general purpose registers and the memory. The one or more instructions additionally specifies which of the register elements to load or store in addition to the number of register elements to be transferred. In another form, when only a subset of the multiple data elements is transferred between each of the at least two of the plurality of general purpose registers and the memory, any unspecified data elements are filled with a predetermined value.

According to another aspect, a method of transferring data elements in a data processing system includes storing operands in a memory. Multiple data elements are stored in each of a plurality of general purpose registers. One or more instructions are executed by the data processing system. At least one of the one or more instructions causes a transfer of a plurality of data elements between the memory and the at least two of the plurality of general purpose registers. The at least one or more instructions specifies a number of register elements to be transferred between each of the at least two of the plurality of general purpose registers and the memory.

According to another aspect, a data processing system includes a memory for storing operands and a plurality of general purpose registers wherein each general purpose register holds multiple data elements. Processor circuitry executes one or more instructions, at least one of the one or more instructions transfers a plurality of data elements between the memory and the at least two of the plurality of general purpose registers. The at least one or more instructions specifies which data elements of the at least two of the plurality of general purpose registers are to be transferred. When only a subset of the multiple data elements is transferred, any unspecified data elements are filled by the processor circuitry with a predetermined value. In one form the data elements specified by the at least one or more instructions are contiguously positioned within the at least two of the plurality of general purpose registers. In another form the data elements specified by the at least one or more instructions are not contiguously positioned within the at least two of the plurality of general purpose registers.

According to another aspect, a method of transferring data elements in a data processing system includes storing operands in a memory and holding multiple data elements in each of a plurality of general purpose registers. One or more instructions are executed, at least one of the one or more instructions causing a transfer of a plurality of data elements between the memory and at least two of the plurality of general purpose registers wherein the at least one or more instructions specifies which data elements of the at least two of the plurality of general purpose registers are to be transferred.

According to another aspect, a data processing system includes a memory for storing operands and a plurality of general purpose registers wherein each general purpose register holds multiple data elements. Processor circuitry executes one or more instructions, at least one of the one or more instructions transfers a plurality of data elements between the memory and the at least two of the plurality of general purpose registers wherein the at least one or more instructions specifies both a number of data elements to be transferred between each of the at least two of the plurality of general purpose registers and the memory and further specifies a total number of data elements to be transferred.

According to another aspect, a data processing system includes a memory for storing operands and at least one general purpose register. Processor circuitry executes one or more instructions, at least one of the one or more instructions for transferring data elements between the memory and the at least one general purpose register wherein one of the one or more instructions specifies: (a) a first offset between data elements within a first portion of successive data elements in the memory; (b) a first number of data elements to be transferred between the memory and the at least one GPR; and (c) a second offset between the first portion and a second portion of data elements in the memory. In one form, the one of the one or more instructions further specifies a data element size of the data elements in the memory. In another form, the one of the one or more instructions further specifies size of data elements in the memory separate and independent from specifying size of data elements in the at least one general purpose register. The processor circuitry determines a total number of data elements to be transferred based on size of data elements in the memory. The processor circuitry may determine a total number of data elements to be transferred based on size of data elements in the at least one general purpose register. The one of the one or more instructions may further specify a total number of data elements to be transferred between the memory and the at least one general purpose register. The data processing system may further include a first general purpose register and a second general purpose register wherein the one of the one or more instructions transfers data elements between the memory and both the first general purpose register and the second general purpose registers in response to executing the one of the one or more instructions. The one of the one or more instructions may further specify a total number of data elements to be transferred between the memory and both the first general purpose register and the second general purpose register. If the total number of data elements transferred does not completely fill the second general purpose register, the processor circuitry may fill at least a portion of any remaining bit locations with a predetermined value. The one of the one or more instructions may further separately specify a number of data elements to be transferred between the memory and each of the first and second general purpose registers. If the total number of data elements transferred does not completely fill the second general purpose register, the processor circuitry may fill at least a portion of any remaining bit locations with a predetermined value. The one of the one or more instructions may further include a specifier wherein the second offset is used no more than once by the processor circuitry while transferring the first number of data elements. The processor circuitry may communicate data elements in the memory by using a circular buffer when the one of the one or more instructions specifies that the second offset is to be used only once. The one of the one or more instructions may further include a specifier wherein the second offset is used more than once by the processor circuitry if the first number of data elements to be transferred is larger than twice the first portion of data elements to be transferred.

According to another aspect, a data processing system includes a memory for storing operands and at least one general purpose register. Processor circuitry executes one or more instructions, at least one of the one or more instructions transfers data elements between the memory and the at least one general purpose register wherein one of the one or more instructions specifies a radix specifier for implementing transferring one or more data elements in a bit-reversed order between the memory and the at least one general purpose register.

According to another aspect, a method for using multiple addressing modes provides a memory for storing operands. At least one general purpose register is provided. One or more instructions are executed, at least one of the one or more instructions transferring data elements between the memory and the at least one general purpose register. The at least one of the one or more instructions specifies a first offset between data elements within a first portion of successive data elements in the memory. The at least one of the one or more instructions specifies a first number of data elements to be transferred between the memory and the at least one general purpose register (GPR). The at least one of the one or more instructions may further specify a second offset between the first portion and a second portion of data elements in the memory. The at least one of the one or more instructions may be used to further specify a data element size of the data elements in the memory. The at least one of the one or more instructions may be used to further specify size of data elements in the memory separate and independent from specifying size of data elements in the at least one general purpose register. A processor may be used to determine a total number of data elements to be transferred based on size of data elements in the memory. The processor may be used to determine a total number of data elements to be transferred based on size of data elements in the at least one general purpose register. The at least one instruction of the one or more instructions may be used to further specify a total number of data elements to be transferred between the memory and the at least one general purpose register. A first general purpose register and a second general purpose register may be provided and transfer data elements between the memory and both the first general purpose register and the second general purpose registers in response to executing the one of the one or more instructions. The one of the one or more instructions may be used to further specify a total number of data elements to be transferred between the memory and both the first general purpose register and the second general purpose register. In one form, at least a portion of any remaining unfilled bit locations in the second general purpose register are filled with a predetermined value if a total number of data elements transferred does not completely fill the second general purpose register. The one of the one or more instructions may be used to further separately specify a number of data elements to be transferred between the memory and each of the first and second general purpose registers. In one form, if the total number of data elements transferred does not completely fill the second general purpose register, at least a portion of any remaining bit locations are filled with a predetermined value such as zero. A specifier in the one of the one or more instructions may be provided wherein in response to the specifier, the second offset is used only once by a processor transferring the first number of data elements.

According to another aspect, data elements in the memory may be communicated under control of the processor by using a circular buffer when the one of the one or more instructions specifies that the second offset is to be used only once. A specifier in the one of the one or more instructions is provided wherein in response to the specifier, the second offset is used more than once by a processor if the first number of data elements to be transferred is larger than twice the number of data elements in the first portion of data elements in the memory. A radix specifier in the one of the one or more instructions may be provided, the radix specifier implementing transfer of one or more data elements in a bit-reversed order between the memory and the at least one general purpose register.

According to another aspect, a data processing addressing method includes providing a memory for storing operands and providing at least one general purpose register. One or more instructions are executed, at least one of the one or more instructions transferring data elements between the memory and the at least one general purpose register. The at least one of the one or more instructions specify a radix specifier in the one of the one or more instructions, the radix specifier implementing transfer of one or more data elements in a bit-reversed order between the memory and the at least one general purpose register.

According to another aspect, a data processing system addressing method includes providing a memory for storing operands and providing at least one general purpose register. Processor circuitry is provided for executing one or more instructions. At least one of the one or more instructions transfer data elements between the memory and the at least one general purpose register wherein one of the one or more instructions implements stores predetermined data elements in the memory in a bit-reversed order and transfers the predetermined data elements into the at least one general purpose register. The at least one of the one or more instructions further specifies a number of data elements to transfer into the at least one general purpose register. In another form, the at least one of the one or more instructions further specifies size of data elements in the memory separate and independent from specifying size of data elements in the at least one general purpose register.

According to another aspect, a data processing system addressing method includes providing a memory for storing operands and providing at least one general purpose register. Processor circuitry is provided for executing one or more instructions, at least one of the one or more instructions transferring data elements between the memory and the at least one general purpose register wherein one of the one or more instructions stores predetermined data elements in the memory in a sequential order and transferring the predetermined data elements into the at least one general purpose register in a bit-reversed order.

According to another aspect, a data processing system addressing method includes providing a memory for storing operands and providing at least one general purpose register. Processor circuitry is provided for executing one or more instructions, at least one of the one or more instructions transferring data elements between the memory and the at least one general purpose register wherein one of the one or more instructions implements storing predetermined data elements in the at least one general purpose register in a bit-reversed order and transferring the predetermined data elements into the memory.

According to another aspect, a data processing system addressing method includes providing a memory for storing operands and providing at least one general purpose register. Processor circuitry is provided for executing one or more instructions, at least one of the one or more instructions transferring data elements between the memory and the at least one general purpose register wherein one of the one or more instructions stores predetermined data elements in the at least one general purpose register in a sequential order and transferring the predetermined data elements into the memory in a bit-reversed order.

In the foregoing specification, the invention has been described with reference to specific embodiments, examples, and aspects. However, one of ordinary skill in the art appreciates that various modifications and changes can be made without departing from the scope of the present invention as set forth in the claims below. For example, the block diagrams may include different blocks than those illustrated and may have more or fewer blocks or be arranged differently. Also, as another example, the instructions described herein can have various different formates and use different control fields and parameters than those illustrated. Each instruction may even be implemented as multiple instructions. Also, as another example, the registers described herein can be any type of storage circuitry located anywhere within the data processing system. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A data processing system comprising:
   a memory for storing operands;
   a plurality of general purpose registers wherein each general purpose register holds multiple data elements; and
   processor circuitry for executing one or more instructions, at least one of the one or more instructions for transferring a plurality of data elements between the memory and the at least two of the plurality of general purpose registers wherein the at least one or more instructions specifies a number of data elements to be transferred between each of the at least two of the plurality of general purpose registers and the memory, wherein the at least one of the one or more instructions provides a first offset between data elements within a first portion of successive data elements to be stored into the memory or loaded from the memory and a second offset between a first portion and a second portion of the data elements to be stored into the memory or loaded from the memory.

2. The data processing system of claim 1 wherein the one or more instructions additionally specifies which of the data elements to load or store in addition to the number of data elements to be transferred.

3. The data processing system of claim 1 wherein when only a subset of the multiple data elements is transferred between each of the at least two of the plurality of general purpose registers and the memory, any unspecified data elements are filled with a predetermined value.

4. The data processing system of claim 3 wherein the predetermined value comprises a zero value having all bits equal to zero.

5. The data processing system of claim 1, wherein the number of data elements specified by the at least one or more instructions specifies only a subset of the multiple data elements in each of the at least two general purpose registers to be transferred.

6. A method of transferring data elements in a data processing system comprising:
   storing operands in a memory;
   storing multiple data elements in each of a plurality of general purpose registers; and
   executing one or more instructions in the data processing system, at least one of the one or more instructions causing a transfer of a plurality of data elements between the memory and the at least two of the plurality of general purpose registers, wherein the at least one or more instructions specifies a number of data elements to be transferred between each of the at least two of the plurality of general purpose registers and the memory, wherein the at least one of the one or more instructions provides a first offset between data elements within a first portion of successive data elements to be stored into the memory or loaded from the memory and a second offset between a first portion and a second portion of the data elements to be stored into the memory or loaded from the memory.

7. The method of claim 6 further comprising:
   specifying with each of the one or more instructions which of the data elements to load or store in addition to the number of data elements to be transferred.

8. The method of claim 6 further comprising:
   when only a subset of the multiple data elements is transferred between each of the at least two of the plurality of general purpose registers and the memory, filling any unspecified data elements with a predetermined value.

9. A data processing system comprising:
   a memory for storing operands;
   a plurality of general purpose registers wherein each general purpose register holds multiple data elements; and
   processor circuitry for executing one or more instructions, at least one of the one or more instructions for transferring a plurality of data elements between the memory and the at least two of the plurality of general purpose registers wherein the at least one or more instructions specifies which subset of the multiple data elements in each of the at least two of the plurality of general purpose registers are to be transferred, wherein the at least one of the one or more instructions provides a first offset between data elements within a first portion of successive data elements to be stored into the memory or loaded from the memory and a second offset between a first portion and a second portion of the data elements to be stored into the memory or loaded from the memory.

10. The data processing system of claim 9 wherein, any unspecified data elements are filled by the processor circuitry with a predetermined value.

11. The data processing system of claim 10 wherein the predetermined value is a zero value.

12. The data processing system of claim 9 wherein the subset of the multiple data elements specified by the at least one or more instructions are contiguously positioned within the at least two of the plurality of general purpose registers.

13. The data processing system of claim 9 wherein the subset of the multiple data elements specified by the at least one or more instructions are not contiguously positioned within the at least two of the plurality of general purpose registers.

14. A method of transferring data elements in a data processing system comprising:
storing operands in a memory;
holding multiple data elements in each of a plurality of general purpose registers; and
executing one or more instructions, at least one of the one or more instructions causing a transfer of a plurality of data elements between the memory and at least two of the plurality of general purpose registers wherein the at least one or more instructions specifies which subset of the multiple data elements in each of the at least two of the plurality of general purpose registers are to be transferred, wherein the at least one of the one or more instructions provides a first offset between data elements within a first portion of successive data elements to be stored into the memory or loaded from the memory and a second offset between a first portion and a second portion of the data elements to be stored into the memory or loaded from the memory.

15. The method of claim 14 further comprising filling any unspecified data elements with a predetermined value.

16. A data processing system comprising:
a memory for storing operands;
a plurality of general purpose registers wherein each general purpose register holds multiple data elements; and
processor circuitry for executing one or more instructions, at least one of the one or more instructions for transferring a plurality of data elements between the memory and the at least two of the plurality of general purpose registers wherein the at least one or more instructions specifies both a number of data elements to be transferred between each of the at least two of the plurality of general purpose registers and the memory and further specifies a total number of data elements to be transferred, wherein the at least one of the one or more instructions provides a first offset between data elements within a first portion of successive data elements to be stored into the memory or loaded from the memory and a second offset between a first portion and a second portion of the data elements to be stored into the memory or loaded from the memory.

17. The data processing system of claim 16 wherein when a total number of data elements to be transferred is greater than a number of data elements to be transferred to each of the at least two of the plurality of general purpose registers, data elements are transferred to a predetermined one of the plurality of general purpose registers.

18. The data processing system of claim 16 wherein when a total number of data elements to be transferred is less than a number of data elements to be transferred to each of the at least two of the plurality of general purpose registers, any remaining specified data elements of the plurality of general purpose registers are filled with a predetermined value.

19. The data processing system of claim 18 wherein the predetermined value is a zero value.

20. The data processing system of claim 16 wherein the one or more instructions specifies by using a field in the instruction to identify the number of data elements to be transferred between each of the at least two of the plurality of general purpose registers and the memory and to identify the total number of data elements to be transferred.

21. The data processing system of claim 16 wherein the one or more instructions specifies by identifying a register within the data processing system that contains information to identify the number of data elements to be transferred between each of the at least two of the plurality of general purpose registers and the memory and to identify the total number of data elements to be transferred.

22. The data processing system of claim 16 wherein the data elements are positioned in contiguous storage locations in the memory.

23. The data processing system of claim 16 wherein the data elements are positioned in non-contiguous storage locations in the memory.

* * * * *